US012786688B2

(12) United States Patent
Zhang

(10) Patent No.: US 12,786,688 B2
(45) Date of Patent: Nov. 3, 2026

(54) DATA TRANSMISSION METHOD AND TERMINAL DEVICE

(71) Applicant: Honor Device Co., Ltd., Shenzhen (CN)

(72) Inventor: Jian Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 258 days.

(21) Appl. No.: 18/720,228

(22) PCT Filed: Dec. 30, 2022

(86) PCT No.: PCT/CN2022/144214

§ 371 (c)(1),
(2) Date: Jun. 14, 2024

(87) PCT Pub. No.: WO2023/173906

PCT Pub. Date: Sep. 21, 2023

(65) Prior Publication Data

US 2026/0172809 A1 Jun. 18, 2026

(30) Foreign Application Priority Data

Mar. 14, 2022 (CN) ........................ 202210246352.X

(51) Int. Cl.
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
CPC ..... H04W 8/183; H04W 8/205; H04W 72/21; H04W 72/23; H04W 74/004; H04W 74/006
USPC ..... 455/418, 420, 424, 425, 426.1; 370/277, 370/278, 328, 330, 345; 375/259, 260
See application file for complete search history.

(56) References Cited

U.S. PATENT DOCUMENTS

2014/0220992 A1 8/2014 Henneberg Rysgaard et al.
2020/0374785 A1* 11/2020 Li ........................... H04W 8/24
2021/0105078 A1* 4/2021 Majmundar .......... H04W 76/19
(Continued)

FOREIGN PATENT DOCUMENTS

CN 102271367 A 12/2011
CN 108200598 A 6/2018
(Continued)

*Primary Examiner* — Young T. Tse
(74) *Attorney, Agent, or Firm* — Leydig, Voit & Mayer, Ltd.

(57) ABSTRACT

This application provides a data transmission method and a terminal device. The terminal device includes a primary subscriber identity module (SIM) card and a secondary SIM card. When the primary SIM card detects that a specified event is started, the terminal device obtains remaining duration corresponding to the secondary SIM card. The terminal device determines first preset duration corresponding to the specified event. When the remaining duration is less than the first preset duration, the terminal device sends preset signaling to a network device through small data transmission. According to this application, it may be determined, based on a currently started event, whether to transmit the preset signaling through small data transmission.

20 Claims, 12 Drawing Sheets

(56) References Cited

U.S. PATENT DOCUMENTS

| | | | | |
|---|---|---|---|---|
| 2022/0264511 | A1* | 8/2022 | Lee | H04W 8/183 |
| 2022/0394459 | A1 | 12/2022 | Jin et al. | |
| 2023/0179986 | A1* | 6/2023 | Ghosh | H04W 68/00<br>455/418 |
| 2023/0403703 | A1* | 12/2023 | Kiilerich Pratas | H04W 24/02 |

FOREIGN PATENT DOCUMENTS

| | | | |
|---|---|---|---|
| CN | 110234109 | A | 9/2019 |
| CN | 110536409 | A | 12/2019 |
| CN | 111385787 | A | 7/2020 |
| CN | 112788745 | A | 5/2021 |
| WO | 2021170907 | A1 | 9/2021 |

* cited by examiner

DATA TRANSMISSION METHOD AND TERMINAL DEVICE

CROSS-REFERENCE TO RELATED APPLICATIONS

This application is a national stage of International Application No. PCT/CN2022/144214, filed on Dec. 30, 2022, which claims priority to Chinese Patent Application No. 202210246352.X, filed on Mar. 14, 2022. The disclosures of both of the aforementioned applications are hereby incorporated by reference in their entireties.

TECHNICAL FIELD

Embodiments of this application relate to the field of communication technologies, and in particular, to a data transmission method and an electronic device.

BACKGROUND

With development of communication technologies, dual SIM terminal devices are commonly used. A user may use two SIM (Subscriber Identification Module, subscriber identity module) cards in one dual SIM terminal device, the two SIM cards may simultaneously be connected to a network, and the two SIM cards may reside in the network in a plurality of combination forms. For example, the two SIM cards reside in a 4G (4th generation) network, or the two SIM cards reside in a 5G (5th generation) network, or one SIM card resides in a 4G network and the other SIM card resides in a 5G network.

Currently, the dual SIM terminal device usually has only one set of uplink radio frequency resources. When a primary subscriber identity module SIM card of the terminal device enables data traffic to execute a data service, and a secondary subscriber identity module SIM card needs to perform corresponding data transmission, the terminal device needs to schedule the uplink radio frequency resources to the secondary subscriber identity module SIM card for use. In this case, a phenomenon that the secondary subscriber identity module SIM card occupies the radio frequency resources of the primary subscriber identity module SIM card occurs. Therefore, how to reduce impact on the primary subscriber identity module SIM card that is caused by preempting the radio frequency resources by the secondary subscriber identity module SIM card is a technical problem that urgently needs to be resolved.

SUMMARY

To resolve the foregoing technical problem, this application provides a data transmission method and a terminal device. In this method, a terminal device determines, based on a currently started event, whether to transmit preset signaling through small data transmission, so that impact on a data service of a primary subscriber identity module SIM card that is caused by a secondary subscriber identity module SIM card can be reduced to some extent, thereby ensuring use experience of a user.

According to a first aspect, an embodiment of this application provides a data transmission method. The method includes: When a primary subscriber identity module SIM card detects that a specified event is started, a terminal device obtains remaining duration corresponding to a secondary subscriber identity module SIM card. The terminal device periodically sends preset signaling to a network device through the secondary subscriber identity module SIM card, and the remaining duration is duration between a current moment and a moment at which the terminal device sends the preset signaling to the network device through the secondary subscriber identity module SIM card next time. The terminal device determines first preset duration corresponding to the specified event. When the remaining duration is less than the first preset duration, the terminal device sends the preset signaling to the network device through small data transmission.

For example, the first preset duration may be 20 minutes.

According to a first aspect, that the terminal device sends the preset signaling to the network device through small data transmission includes: obtaining a quantity of bits of the preset signaling, and determining a channel condition corresponding to the secondary subscriber identity module SIM card; obtaining small data transmission duration based on the quantity of bits of the preset signaling and the channel condition; and if the small data transmission duration is less than second preset duration and the small data transmission duration is less than the remaining duration, sending the preset signaling to the network device through small data transmission. In this way, the terminal device can more efficiently implement transmission of the preset signaling.

For example, the second preset duration may be 1.5 seconds.

According to either of the first aspect or the foregoing implementation of the first aspect, if the small data transmission duration is greater than the second preset duration or the small data transmission duration is greater than the remaining duration, the secondary subscriber identity module SIM card is switched from an inactive state to a connected state; and the preset signaling is sent to the network device. In this way, flexibility of transmission of the preset signaling can be improved to some extent.

According to any one of the first aspect or the foregoing implementations of the first aspect, the obtaining small data transmission duration based on the quantity of bits of the preset signaling and the channel condition includes: obtaining a first modulation and coding policy based on the channel condition; obtaining historical transmission information corresponding to the secondary subscriber identity module SIM card, and making a prediction on the historical transmission information to obtain a first scheduled resource quantity; obtaining a target data amount based on the first modulation and coding policy and the first scheduled resource quantity; and obtaining the small data transmission duration based on the target data amount and the quantity of bits of the preset signaling. In this way, the terminal device can obtain more accurate small data transmission duration, so that accuracy of data transmission can be improved.

According to any one of the first aspect or the foregoing implementations of the first aspect, the preset signaling includes at least one piece of small data, and the sending the preset signaling to the network device through small data transmission includes: sending the small data through small data transmission for the first time; receiving uplink grant information transmitted by the network device, where the uplink grant information includes a second modulation and coding policy and a second scheduled resource quantity; determining, based on the uplink grant information, whether to continue sending remaining small data through small data transmission; and if it is determined, based on the uplink grant information, to continue sending the remaining small data through small data transmission, sending the preset signaling to the network device through small data transmission.

According to any one of the first aspect or the foregoing implementations of the first aspect, the determining, based on the uplink grant information, whether to continue sending remaining small data through small data transmission includes: updating the small data transmission duration based on the second modulation and coding policy and the second scheduled resource quantity, to obtain target transmission duration; and if the target transmission duration is less than the second preset duration, determining to continue sending the remaining small data through small data transmission. In this way, finally obtained small data transmission duration can be more accurate, so that accuracy of data transmission is improved.

According to any one of the first aspect or the foregoing implementations of the first aspect, if the target transmission duration is greater than the second preset duration, sending the remaining small data through small data transmission is stopped. In this way, the terminal device can more flexibly transmit the preset signaling.

According to any one of the first aspect or the foregoing implementations of the first aspect, the determining, based on the uplink grant information, whether to continue sending remaining small data through small data transmission includes: determining whether the second scheduled resource quantity is less than n times the first scheduled resource quantity, where n is less than 1; and if the second scheduled resource quantity is not less than n times the first scheduled resource quantity, continuing sending the remaining small data through small data transmission.

For example, n may be 0.8 or 0.75.

According to any one of the first aspect or the foregoing implementations of the first aspect, if the second scheduled resource quantity is less than n times the first scheduled resource quantity, sending the remaining small data through small data transmission is stopped. In this way, the terminal device can more flexibly transmit the preset signaling.

According to any one of the first aspect or the foregoing implementations of the first aspect, that the terminal device sends the preset signaling to the network device through small data transmission includes: screening the preset signaling through incremental transmission and/or signaling streamlining to obtain target signaling, where the incremental transmission is used to select changing data from the preset signaling, and the signaling streamlining is used to select user identification information from the preset signaling; and sending the target signaling to the network device through small data transmission.

According to any one of the first aspect or the foregoing implementations of the first aspect, that when the primary subscriber identity module SIM card detects that the specified event is started, the terminal device obtains the remaining duration corresponding to the secondary subscriber identity module SIM card includes: The primary subscriber identity module SIM card detects whether a specified application is started. If the primary subscriber identity module SIM card detects that the specified application is started, the terminal device obtains the remaining duration corresponding to the secondary subscriber identity module SIM card.

For example, the specified application may be a game application, or may be a video application.

According to any one of the first aspect or the foregoing implementations of the first aspect, the specified application includes at least one service scenario, and that if the primary subscriber identity module SIM card detects that the specified application is started, the terminal device obtains the remaining duration corresponding to the secondary subscriber identity module SIM card includes: If the primary subscriber identity module SIM card detects that the specified application is started, a service scenario in which the specified application is currently located is obtained. If the service scenario is a specified service scenario, the terminal device obtains the remaining duration corresponding to the secondary subscriber identity module SIM card.

According to any one of the first aspect or the foregoing implementations of the first aspect, the corresponding first preset duration varies with the specified event.

According to any one of the first aspect or the foregoing implementations of the first aspect, the specified event includes a specified game.

According to any one of the first aspect or the foregoing implementations of the first aspect, the preset signaling includes IMS re-registration signaling.

According to a second aspect, an embodiment of this application provides a terminal device. The terminal device includes: one or more processors; a memory; and one or more computer programs, where the one or more computer programs are stored in the memory, and when the computer programs are executed by the one or more processors, the terminal device is enabled to perform the following steps: When a primary subscriber identity module SIM card detects that a specified event is started, the terminal device obtains remaining duration corresponding to a secondary subscriber identity module SIM card. The terminal device periodically sends preset signaling to a network device through the secondary subscriber identity module SIM card, and the remaining duration is duration between a current moment and a moment at which the terminal device sends the preset signaling to the network device through the secondary subscriber identity module SIM card next time. The terminal device determines first preset duration corresponding to the specified event. When the remaining duration is less than the first preset duration, the terminal device sends the preset signaling to the network device through small data transmission.

According to a second aspect, when the computer programs are executed by the one or more processors, the terminal device is enabled to perform the following steps: obtaining a quantity of bits of the preset signaling, and determining a channel condition corresponding to the secondary subscriber identity module SIM card; obtaining small data transmission duration based on the quantity of bits of the preset signaling and the channel condition; and if the small data transmission duration is less than second preset duration and the small data transmission duration is less than the remaining duration, sending the preset signaling to the network device through small data transmission.

According to either of the second aspect or the foregoing implementation of the second aspect, when the computer programs are executed by the one or more processors, the terminal device is enabled to perform the following steps: if the small data transmission duration is greater than the second preset duration or the small data transmission duration is greater than the remaining duration, switching the secondary subscriber identity module SIM card from an inactive state to a connected state; and sending the preset signaling to the network device.

According to any one of the second aspect or the foregoing implementations of the second aspect, when the computer programs are executed by the one or more processors, the terminal device is enabled to perform the following steps: obtaining a first modulation and coding policy based on the channel condition; obtaining historical transmission information corresponding to the secondary subscriber identity module SIM card, and making a prediction on the historical transmission information to obtain a first scheduled resource quantity; obtaining a target data amount based on the first modulation and coding policy and the first scheduled resource quantity; and obtaining the small data transmission duration based on the target data amount and the quantity of bits of the preset signaling.

According to any one of the second aspect or the foregoing implementations of the second aspect, the preset signaling includes at least one piece of small data, and when the computer programs are executed by the one or more processors, the terminal device is enabled to perform the following steps: sending the small data through small data transmission for the first time; receiving uplink grant information transmitted by the network device, where the uplink grant information includes a second modulation and coding policy and a second scheduled resource quantity; determining, based on the uplink grant information, whether to continue sending remaining small data through small data transmission; and if it is determined, based on the uplink grant information, to continue sending the remaining small data through small data transmission, sending the remaining small data to the network device through small data transmission.

According to any one of the second aspect or the foregoing implementations of the second aspect, when the computer programs are executed by the one or more processors, the terminal device is enabled to perform the following steps: updating the small data transmission duration based on the second modulation and coding policy and the second scheduled resource quantity, to obtain target transmission duration; and if the target transmission duration is less than the second preset duration, determining to continue sending the remaining small data through small data transmission.

According to any one of the second aspect or the foregoing implementations of the second aspect, when the computer programs are executed by the one or more processors, the terminal device is enabled to perform the following step: if the target transmission duration is greater than the second preset duration, stopping sending the remaining small data through small data transmission.

According to any one of the second aspect or the foregoing implementations of the second aspect, when the computer programs are executed by the one or more processors, the terminal device is enabled to perform the following steps: determining whether the second scheduled resource quantity is less than n times the first scheduled resource quantity, where n is less than 1; and if the second scheduled resource quantity is not less than n times the first scheduled resource quantity, continuing sending the remaining small data through small data transmission.

According to any one of the second aspect or the foregoing implementations of the second aspect, when the computer programs are executed by the one or more processors, the terminal device is enabled to perform the following step: if the second scheduled resource quantity is less than n times the first scheduled resource quantity, stopping sending the remaining small data through small data transmission.

According to any one of the second aspect or the foregoing implementations of the second aspect, when the computer programs are executed by the one or more processors, the terminal device is enabled to perform the following steps: screening the preset signaling through incremental transmission and/or signaling streamlining to obtain target signaling, where the incremental transmission is used to select changing data from the preset signaling, and the signaling streamlining is used to select user identification information from the preset signaling; and sending the target signaling to the network device through small data transmission.

According to any one of the second aspect or the foregoing implementations of the second aspect, when the computer programs are executed by the one or more processors, the terminal device is enabled to perform the following steps: The primary subscriber identity module SIM card detects whether a specified application is started. If the primary subscriber identity module SIM card detects that the specified application is started, the terminal device obtains the remaining duration corresponding to the secondary subscriber identity module SIM card.

According to any one of the second aspect or the foregoing implementations of the second aspect, the specified application includes at least one service scenario, and when the computer programs are executed by the one or more processors, the terminal device is enabled to perform the following steps: If the primary subscriber identity module SIM card detects that the specified application is started, a service scenario in which the specified application is currently located is obtained. If the service scenario is a specified service scenario, the terminal device obtains the remaining duration corresponding to the secondary subscriber identity module SIM card.

According to any one of the second aspect or the foregoing implementations of the second aspect, the corresponding first preset duration varies with the specified event.

According to any one of the second aspect or the foregoing implementations of the second aspect, the specified event includes a specified game.

According to any one of the second aspect or the foregoing implementations of the second aspect, the preset signaling includes IMS re-registration signaling.

According to a third aspect, an embodiment of this application provides a chip. The chip includes one or more interface circuits and one or more processors. The interface circuit is configured to: receive a signal from a memory of a terminal device, and send the signal to the processor. The signal includes computer instructions stored in the memory. When the processor executes the computer instructions, the terminal device is enabled to perform the data transmission method according to any one of the first aspect and the implementations of the first aspect.

Any one of the third aspect and the implementations of the third aspect corresponds to any one of the first aspect and the implementations of the first aspect, respectively. For technical effects corresponding to any one of the third aspect and the implementations of the third aspect, refer to technical effects corresponding to any one of the first aspect and the implementations of the first aspect. Details are not described herein again.

According to a fourth aspect, an embodiment of this application provides a computer-readable storage medium. The computer-readable storage medium includes a computer program. When the computer program is run on a terminal device, the terminal device is enabled to perform the data transmission method according to any one of the first aspect and the implementations of the first aspect.

Any one of the fourth aspect and the implementations of the fourth aspect corresponds to any one of the first aspect and the implementations of the first aspect, respectively. For technical effects corresponding to any one of the fourth aspect and the implementations of the fourth aspect, refer to technical effects corresponding to any one of the first aspect and the implementations of the first aspect. Details are not described herein again.

DESCRIPTION OF EMBODIMENTS

Figure 1:
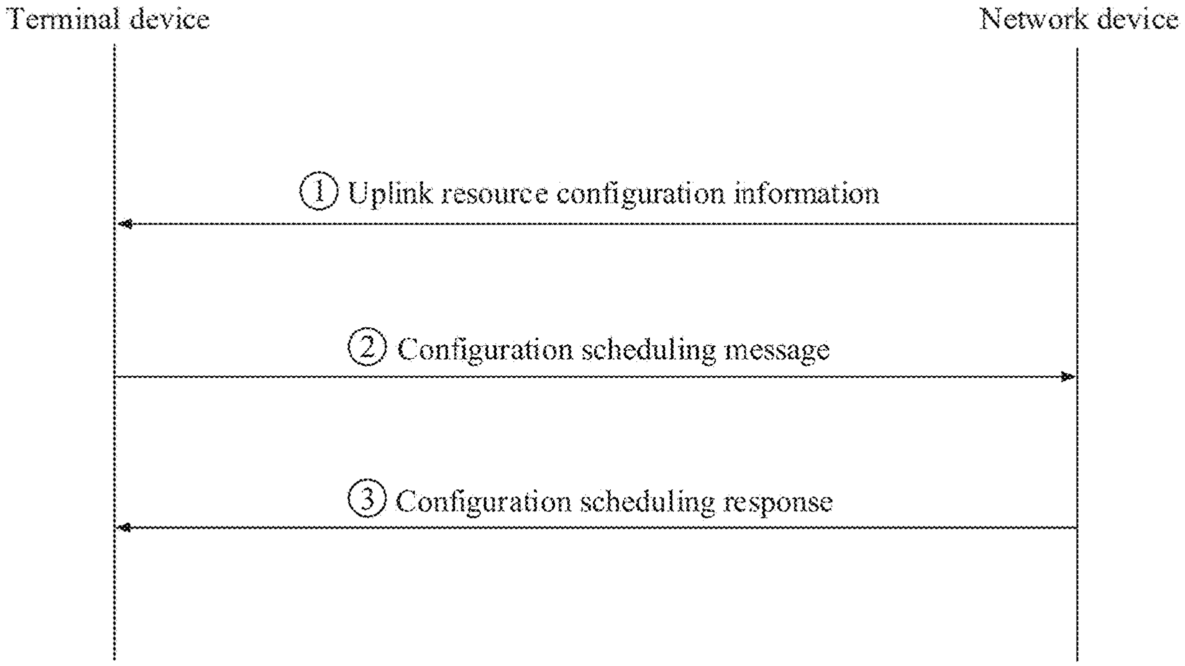
FIG. 1 is a schematic diagram of a CG process.

The following clearly and completely describes the technical solutions of embodiments of this application with reference to the accompanying drawings in the embodiments of this application. Clearly, the described embodiments are some rather than all of the embodiments of this application. All other embodiments obtained by a person of ordinary skill in the art based on the embodiments of this application without making creative efforts shall fall within the protection scope of this application.

It should be understood that when being used in the specification and the appended claims of this application, the term "include" indicates presence of a described feature, entirety, step, operation, element, and/or component, but does not exclude presence or addition of one or more other features, entireties, steps, operations, elements, components, and/or sets thereof.

It should be further understood that in the embodiments of this application, "one or more" means one, two, or more. The term "and/or" describes an association relationship between associated objects and represents that three relationships may exist. For example, A and/or B may represent the following cases: Only A exists, both A and B exist, and only B exists. A and B may be singular or plural. The character "/" in this specification generally indicates an "or" relationship between the associated objects.

In the specification and claims in the embodiments of this application, the terms "first", "second", and the like are intended to distinguish between different objects but do not indicate a particular order of the objects. For example, a first target object, a second target object, and the like are intended to distinguish between different target objects, but do not indicate a particular order of the target objects.

Reference to "one embodiment", "some embodiments", or the like described in the specification of this application means that a specific characteristic, structure, or feature described in combination with one or more embodiments of this application is included in the embodiments. Therefore, statements "in an embodiment", "in some embodiments", "in other embodiments", "in some other embodiments", and the like appearing in different parts of this specification do not necessarily refer to a same embodiment, but mean "one or more but not all embodiments", unless otherwise specified. The terms "include", "contain", "have", and variations thereof all mean "including but not limited to", unless otherwise specified.

In the descriptions of the embodiments of this application, unless otherwise specified, "a plurality of" means two or more. For example, a plurality of processing units mean two or more processing units; and a plurality of systems mean two or more systems.

The technical solutions of the embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G system, or a new radio (NR) system.

For ease of understanding the embodiments of this application, some terms in the embodiments of this application are described below, to facilitate understanding by a person skilled in the art.

(1) Terminal Device

A terminal device includes a device that provides voice and/or data connectivity for a user, and specifically, includes a device that provides voice for the user, or a device that provides data connectivity for the user, or a device that provides both voice and data connectivity for the user. The terminal device may include, for example, a handheld device having a wireless connection function or a processing device connected to a wireless modem.

In a manner, the terminal device may include a user equipment (UE), a wireless terminal device, a mobile terminal device, a user device, or the like. In addition, the terminal device may be a dual SIM terminal device/dual SIM dual standby (DSDS) terminal device, and two subscriber identity module (SIM) cards are installed in the dual SIM terminal device.

Two SIM cards may include a primary subscriber identity module SIM card and a secondary subscriber identity module SIM card. The primary subscriber identity module SIM card supports a data service function and a voice service function. A data service is usually a service, for example, web page browsing, network video playback, and a network game, implemented by using a data communication network. A voice service is usually a voice call service, including calling, being called, and the like. In addition, the secondary subscriber identity module SIM card supports the voice service function.

For ease of description, both a SIM card and an evolution thereof are collectively referred to as a SIM card in the embodiments of this application. For example, in some embodiments, the SIM card may be a universal subscriber identity module (USIM) card or an eSIM card.

The SIM card may include subscriber information such as international mobile subscriber identity (IMSI) or a temporary mobile subscriber identity (TMSI), which is used for user identification. From a perspective of a network side, different SIM cards logically correspond to different communication entities on the network side. For example, for the network side, the dual SIM terminal device may be considered as two communications entities or two user equipments.

It should be noted that two SIM cards in the dual SIM terminal device may be served by a same operator or different operators. This is not limited in the embodiments of this application. In addition, in actual application, one terminal device can support at least two SIM cards. This may be specifically determined based on an actual use requirement, and is not limited in the embodiments of this application.

(2) Network Device

A network device is also referred to as wireless access network device. The network device is a device for connecting a terminal device to a wireless network, and may include an access network device, a core network device, a device (for example, a server) of a service provider, and the like. For example, network device includes but is not limited to a transmission reception point (TRP), a base station (for example, a gNB), a radio network controller (RNC), a NodeB (NB), a base station controller (BSC), a base transceiver station (BTS), a home evolved NodeB (HeNB), a home NodeB (HNB), a baseband unit (BBU), or the like.

(3) Configured Grant (CG)

A configured grant may be that a terminal device uses an uplink transmission resource preconfigured by a network device, or may be an uplink transmission resource that the network device indicates to the terminal device by using higher layer signaling. A CG process may include steps shown in FIG. 1.

Step 1: The network device sends uplink resource configuration information to the terminal device, where an uplink resource used to send uplink data is configured for the terminal device by using the uplink resource configuration information.

Step 2: The terminal device sends a configuration scheduling message to the network device on the uplink resource configured by the network device.

The configuration scheduling message may include small data. The small data may be data of which a quantity of bytes is less than or equal to a preset value, where the preset value is set based on a requirement. For example, the small data may be data of a few bytes, data of tens of bytes, or data of hundreds of bytes. For example, the preset value may be 100 bytes or 1000 bytes.

Step 3: The network device receives the configuration scheduling message, and sends a configuration scheduling response to the terminal device.

The configuration scheduling response may include a response message determined by a bottom layer of the network device and higher layer feedback information that corresponds to the small data and that is determined by a higher layer of the network device.

(4) 4-Step Random Access Channel (4-Step RACH)

Figure 2:
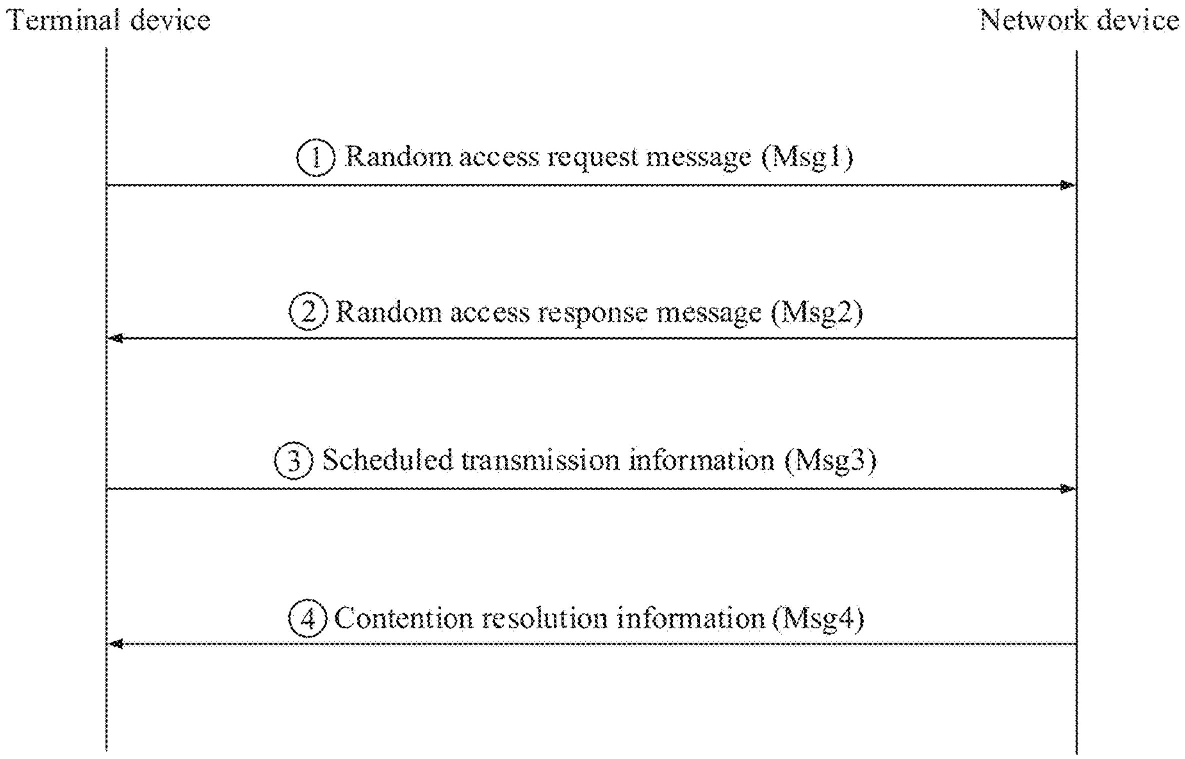
FIG. 2 is a schematic diagram of a 4-step random access procedure.

A 4-step RACH solution may also be referred to as a 4-step random access method. A solution of transmitting a small packet through 4-step RACH is also referred to as an early data transmission (EDT) solution. The 4-step RACH solution includes steps shown in FIG. 2.

Step 1: A terminal device sends a random access request message to a network device, and the network device receives a random access request message from the terminal device. The random access request message may also be referred to as a first message (Msg1), and includes a random access preamble.

The Msg1 may also be referred to as a random access preamble.

Step 2: The network device sends a random access response (RAR) message to the terminal device, and the terminal device receives the RAR message from the network device. The RAR message may also be referred to as a second message (Msg2).

Step 3: The terminal device sends scheduled transmission information to the network device, and the network device receives the scheduled transmission information from the terminal device. A message carrying the scheduled transmission information is referred to as a third message (Msg3).

The Msg3 may include small data and other information. In addition, after receiving the RAR message, the terminal device performs message transmission based on scheduling of the RAR message.

Step 4: The network device sends contention resolution information to the terminal device, where a message carrying the contention resolution information is referred to as a fourth message (Msg4). The terminal device can obtain the contention resolution information once the terminal device receives the Msg4 from the network device.

The Msg4 may include a response message determined by a bottom layer of the network device and higher layer feedback information that corresponds to the small data and that is determined by a higher layer of the network device.

(5) 2-Step Random Access Channel (2-Step RACH)

Figure 3:
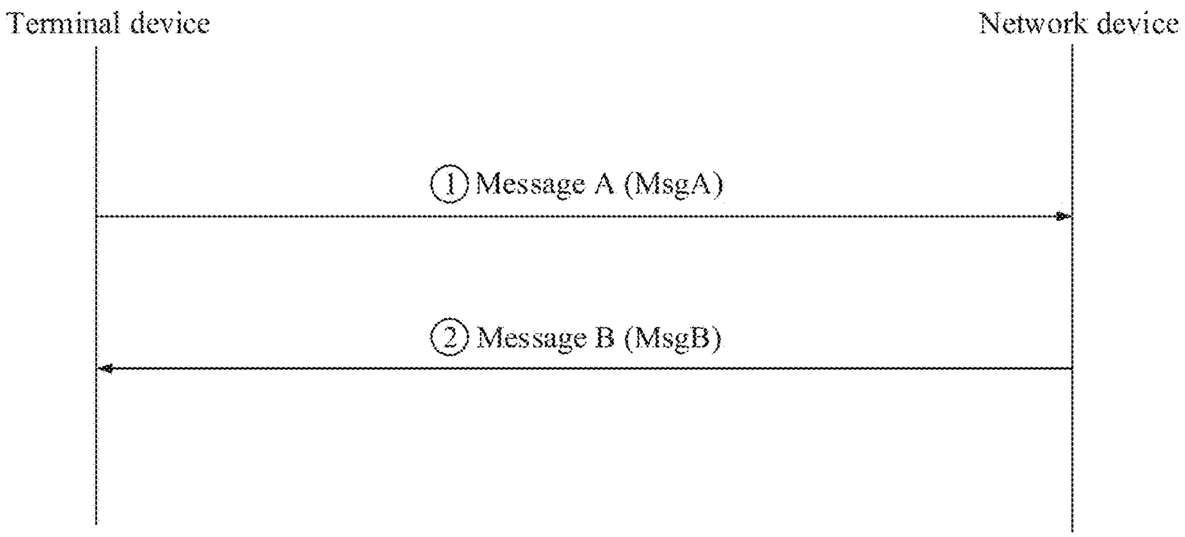
FIG. 3 is a schematic diagram of a 2-step random access procedure.

A 2-step RACH solution may also be referred to as a 2-step random access method. The 2-step RACH solution includes steps shown in FIG. 3.

Step 1: An end device sends a message A (MsgA) to a network device, and the network device receives the MsgA from the terminal device.

The MsgA may include a preamble, and may also include small data and other information.

Step 2: The network device sends a message B (MsgB) to the terminal device, and the terminal device receives the MsgB from the network device.

The MsgB may include contention resolution information and content included in an RAR message.

The MsgB may include a response message determined by a bottom layer of the network device and higher layer feedback information that corresponds to the small data and that is determined by a higher layer of the network device.

The terminal device may perform a radio resource control (RRC) setup procedure with the network device when or after accessing the network device. After the terminal device establishes an RRC connection to the network device, an RRC state of the terminal device is an RRC connected (RRC_CONNECTED) state.

Subsequently, the RRC state of the terminal device may transition between an RRC idle (RRC_IDLE) state, an RRC connected (RRC_CONNECTED) state, and an RRC inactive (RRC_INACTIVE) state.

(6) RRC Connected State

An RRC connected (connected) state may also be referred to as a connected state, and in this specification, "connected state" and "RRC connected state" are the same concept, and the two terms are interchangeable. A terminal device establishes an RRC connection to a network, and can perform data transmission.

(7) RRC Idle State

An RRC idle (idle) state may also be referred to as an idle state. In this specification, "idle state" and "RRC idle state" are the same concept, and the two terms are interchangeable. The RRC idle state means that an RRC connection between a terminal device and a network device is not established and a connection that is between the network device and a core network device and that corresponds to the terminal device is not established. When the terminal device is in the idle state, if there is to-be-transmitted data, a connection between the terminal device and the network device and a connection between the network device and the core network device need to be established before data transmission.

(8) RRC Inactive State

An RRC inactive (inactive) state may also be referred to as an inactive state. In this specification, "inactive state", "RRC inactive state", and the like are the same concept, and these terms are interchangeable. The RRC inactive state means that an RRC connection between a terminal device and a network device is removed but a connection between the network device corresponding to the terminal device and a core network device is not removed. When the terminal device is in the inactive state, if there is to-be-transmitted data, the RRC connection between the terminal device and the network device needs to be resumed before data transmission.

A data transmission method provided in the embodiments of this application may be applied to an electronic device. In addition, the terminal device may be, for example, a mobile phone, a tablet computer, a desktop computer (desktop), a notebook computer (laptop computer), an ultra-mobile personal computer (UMPC), a netbook, a personal digital assistant (PDA), or an augmented reality (AR) \virtual reality (VR) device. A specific form of the terminal device is not specially limited in the embodiments of this application.

For ease of description, the data transmission method provided in the embodiments of this application is described in detail with reference to the following accompanying drawings by using an example in which the terminal device is a mobile phone.

Most existing mobile phones support a dual SIM dual standby function, to be specific, two SIM cards can be inserted into one mobile phone, and the two SIM cards can be on standby at the same time. In addition, the two SIM cards may reside in a same network or different networks. It can be set that one of the SIM cards is used as a primary subscriber identity module SIM card and the other SIM card is used as a secondary subscriber identity module SIM card. The primary subscriber identity module SIM card may be used to support a data service function, and both the primary subscriber identity module SIM card and the secondary subscriber identity module SIM card can support a calling function and a function of being called.

Figure 4:
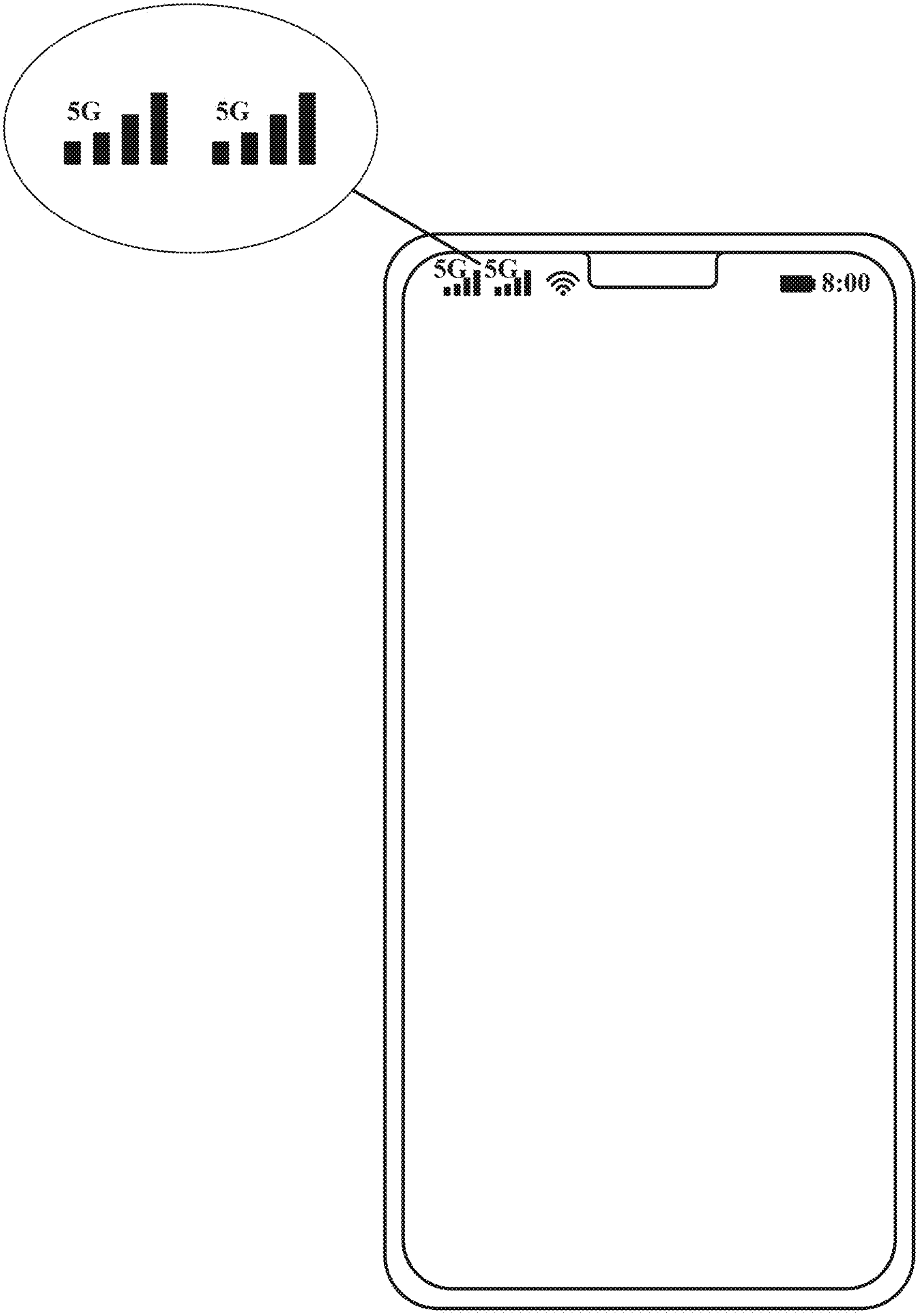
FIG. 4 is a diagram of a display example of a terminal device when a primary subscriber identity module SIM card and a secondary subscriber identity module SIM card reside in a same network.
Figure 5:
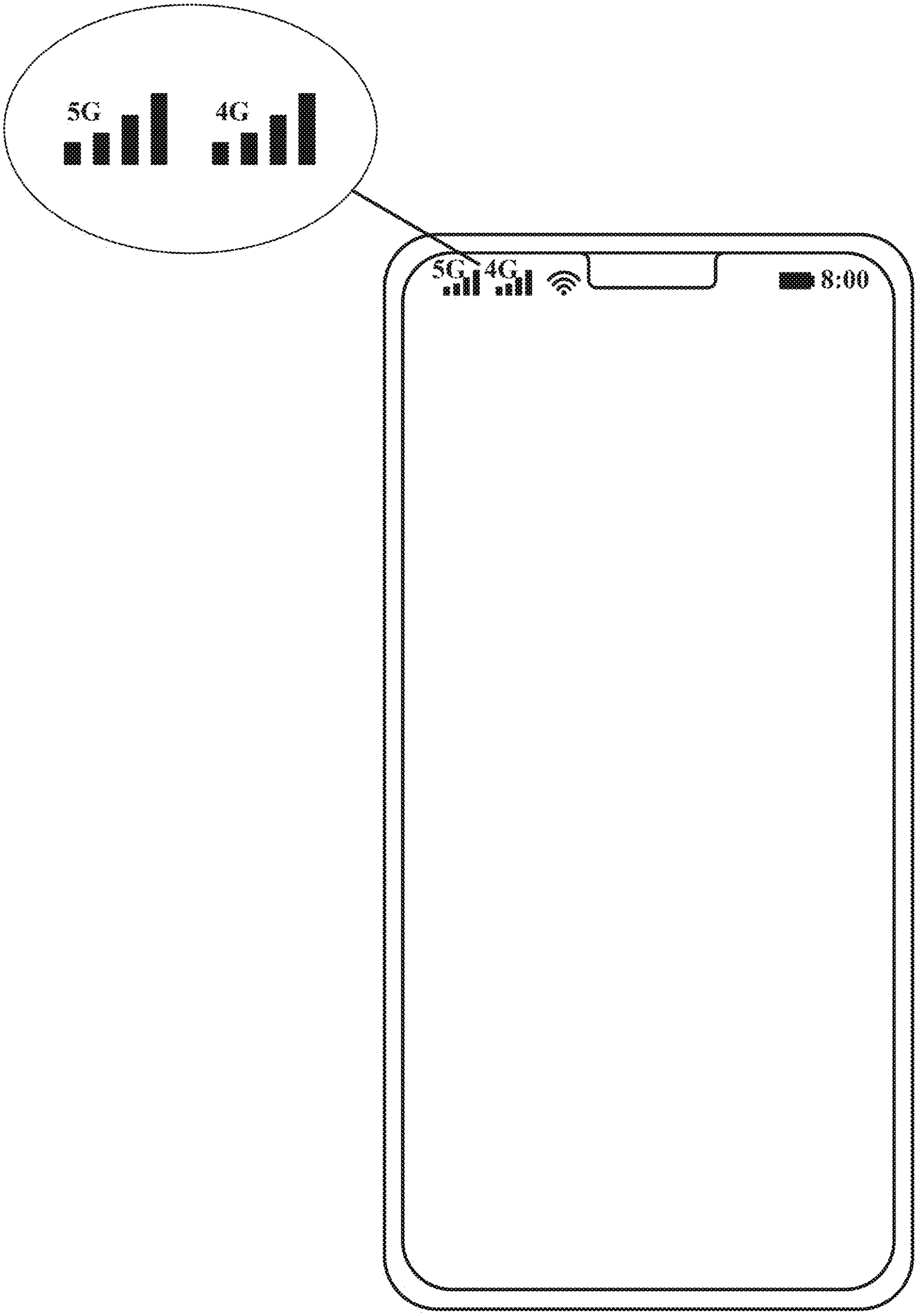
FIG. 5 is a diagram of a display example of a terminal device when a primary subscriber identity module SIM card and a secondary subscriber identity module SIM card reside in different networks.

It can be learned from the foregoing descriptions that the primary subscriber identity module SIM card and the secondary subscriber identity module SIM card may reside on a same network. As shown in FIG. 4, both the primary subscriber identity module SIM card and the secondary subscriber identity module SIM card reside in a 5G network. In addition, the primary subscriber identity module SIM card and the secondary subscriber identity module SIM card may alternatively reside in different networks. As shown in FIG. 5, the primary subscriber identity module SIM card resides in a 5G network, and the secondary subscriber identity module SIM card resides in a long term evolution (LTE) network, namely, a 4G network.

For example, when both the primary subscriber identity module SIM card and the secondary subscriber identity module SIM card reside in the 5G network, a call function of the two SIM cards may be implemented through VoNR (voice over new radio). In addition, to ensure that the two SIM cards can call or be called, the terminal device needs to periodically perform network signaling interaction, for example, IMS (IP multimedia Subsystem) re-registration, tracking area update (TAU), and location area update (LAU).

Currently, a dual SIM terminal device usually has only one set of transmitting radio frequency resources (uplink radio frequency resources), in other words, an existing terminal device can support only dual SIM dual receiving and single transmitting. Specifically, when entering a connected state, a primary subscriber identity module SIM card exclusively occupies the transmitting radio frequency resources, and when entering the connected state for reachability, a secondary subscriber identity module SIM card performs peripheral signaling interaction with a network. For example, the secondary subscriber identity module SIM card may exclusively occupy the transmitting radio frequency resources during IMS re-registration. In this case, a data service of the primary subscriber identity module SIM card is interrupted because the radio frequency resources are preempted, and especially when the primary subscriber identity module SIM card performs a high-requirement service, a lag that can be perceived by a user occurs, and therefore, use experience of the user is affected.

To resolve the foregoing problem, the embodiments of this application provide a data transmission method. In the data transmission method, if it is determined that a specified event is started, preset signaling is sent through small data transmission. In this way, impact on a service of a primary subscriber identity module SIM card that is caused by data transmission of a secondary subscriber identity module SIM card can be reduced to some extent, and use experience of a user can also be ensured.

Figure 6:
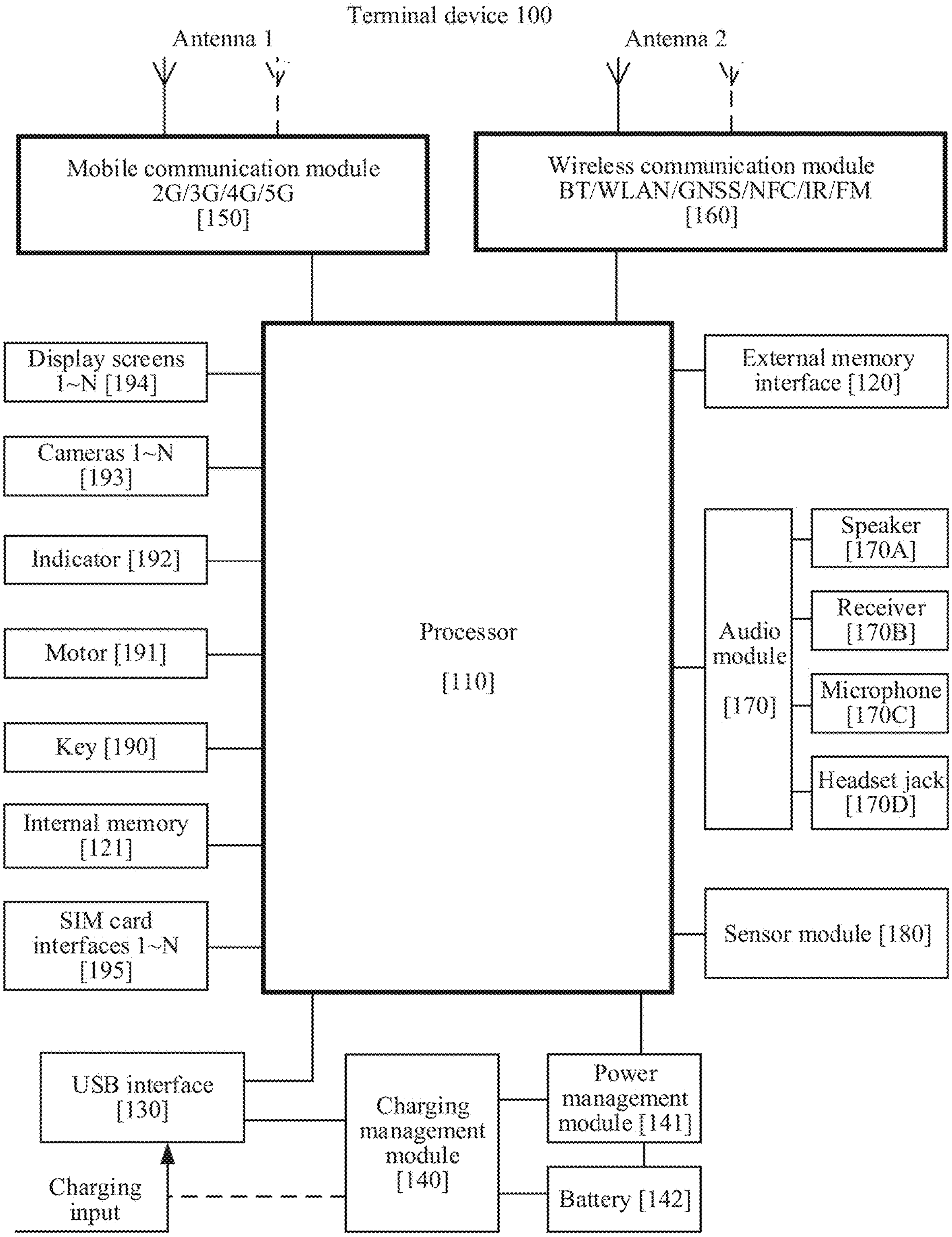
FIG. 6 is a schematic diagram of a structure of a terminal device according to an embodiment of this application.

FIG. 6 is a schematic diagram of a structure of a terminal device 100 according to an embodiment of this application. It should be understood that the terminal device 100 shown in FIG. 6 is merely an example of an electronic device, and the terminal device 100 may include more or fewer components than those shown in the figure, or may combine two or more components, or may have a different component configuration. The components shown in FIG. 6 may be implemented by hardware that includes one or more signal processing and/or application-specific integrated circuits, software, or a combination of hardware and software.

The terminal device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor, a gyroscope sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

It may be understood that the structure shown in this embodiment of this application does not constitute a specific limitation on the terminal device 100. In some other embodiments of this application, the terminal device 100 may include more or fewer components than those shown in the figure, or may combine some components or split some components, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. For example, the processor 110 is configured to perform the data transmission method in the embodiments of this application.

The controller may be a nerve center and a command center of the terminal device 100. The controller may generate an operation control signal based on instruction operation code and a timing signal, to complete control of instruction fetching and instruction execution.

The processor 110 may be further provided with a memory for storing instructions and data. In some embodiments, the memory in the processor 110 is a cache. The USB interface 130 is an interface compliant with a USB standard specification, and may be specifically a Mini USB interface, a Micro USB interface, a USB Type C interface, or the like. The USB interface 130 may be configured to connect to a charger to charge the terminal device 100, or may be configured to perform data transmission between the terminal device 100 and a peripheral device. The USB interface 130 may alternatively be configured to connect to a headset to play audio through the headset. The interface may alternatively be configured to connect to another terminal device such as an AR device.

The charging management module 140 is configured to receive a charging input from the charger. The charger may be a wireless charger, or may be a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the terminal device 100. When charging the battery 142, the charging management module 140 may further supply power to the terminal device by using the power management module 141.

The power management module 141 is connected to the battery 142, the charging management module 140, and the processor 110. The power management module 141 receives an input from the battery 142 and/or the charging management module 140, and supplies power to the processor 110, the internal memory 121, an external memory, the display screen 194, the camera 193, the wireless communication module 160, and the like.

The antenna 1 and the antenna 2 are configured to transmit and receive an electromagnetic wave signal. Each antenna in the terminal device 100 may be configured to cover a single communication frequency band or a plurality of communication frequency bands. Different antennas may be further multiplexed to improve antenna utilization. For example, the antenna 1 may be multiplexed into a diversity antenna of a wireless local area network. In some other embodiments, the antenna may be used in combination with a tuning switch.

The mobile communication module 150 may provide a wireless communication solution that includes 2G/3G/4G/5G or the like and that is applied to the terminal device 100. The mobile communication module 150 may include at least one filter, switch, power amplifier, low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1.

The wireless communication module 160 may provide a wireless communication solution that is applied to the terminal device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like.

In some embodiments, in the terminal device 100, the antenna 1 and the mobile communication module 150 are coupled, and the antenna 2 and the wireless communication module 160 are coupled, so that the terminal device 100 can communicate with a network and another device by using a wireless communication technology.

The terminal device 100 implements a display function by using the GPU, the display screen 194, the application processor, and the like. The GPU is a microprocessor for image processing, and is connected to the display screen 194 and the application processor. The GPU is configured to perform mathematical and geometric calculations for graphics rendering. The processor 110 may include one or more GPUs that execute program instructions to generate or change display information.

The display screen 194 is configured to display an image, a video, or the like. The display screen 194 includes a display panel. The display panel may be a liquid crystal display (LCD), an organic light-emitting diode (OLED) display, or the like. In some embodiments, the terminal device 100 may include one or N display screens 194, where N is a positive integer greater than 1.

The terminal device 100 may implement a photographing function by using the ISP, the camera 193, the video codec, the GPU, the display screen 194, the application processor, and the like.

The camera 193 is configured to capture a still image or a video. An optical image of an object is generated through a lens and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard form, for example, RGB or YUV. In some embodiments, the terminal device 100 may include one or N cameras 193, where N is a positive integer greater than 1.

The external memory interface 120 may be configured to connect to an external storage card, for example, a Micro SD card, to expand a storage capability of the terminal device 100. The external storage card communicates with the processor 110 through the external memory interface 120, to implement a data storage function, for example, store files such as music and a video in the external storage card.

The internal memory 121 may be configured to store computer-executable program code. The executable program code includes instructions. The processor 110 runs the instructions stored in the internal memory 121, to perform various functional applications of the terminal device 100 and execute the instructions in the internal memory 121, so that the terminal device performs the data transmission method in this application. The internal memory 121 may include a program storage area and a data storage area. The program storage area may store an operating system, an application required by at least one function (for example, a sound playing function or an image playing function), and the like. The data storage area may store data (for example, audio data, a phone book, or the like) created during use of the terminal device 100. In addition, the internal memory 121 may include a high-speed random access memory, and may also include a non-volatile memory, for example, at least one magnetic disk storage device, a flash memory device, or a universal flash storage (UFS).

In this embodiment of this application, the internal memory 121 may further store executable program code corresponding to the data transmission method in the embodiments of this application, and the processor may implement data transmission by running the executable program code corresponding to the data transmission method.

The terminal device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode audio signals. In some embodiments, the audio module 170 may be disposed in the processor 110, or some function modules in the audio module 170 are disposed in the processor 110.

The key 190 includes a power key, a volume key, and the like. The key 190 may be a mechanical key, or may be a touch key. The terminal device 100 may receive a key input, and generate a key signal input related to user setting and function control of the terminal device 100.

The motor 191 may generate a vibration prompt. The motor 191 may be used for an incoming call vibration prompt or a touch vibration feedback. For example, touch operations performed on different applications (for example, photographing and audio playback) may correspond to different vibration feedback effects.

The indicator 192 may be an indicator light, and may be configured to indicate a charging status or a power change, and may also be configured to indicate a message, a missed call, a notification, and the like.

A specific structure of an execution body of a data transmission method is not specially limited in the embodiments of this application, provided that code recoding the data transmission method in the embodiments of this application can be run to perform processing according to the data transmission method provided in the embodiments of this application. For example, the execution body of the data transmission method provided in the embodiments of this application may be a function module that is in a terminal device and that can invoke a program and execute the program or a processing apparatus applied to a terminal device, for example, a chip.

A plurality of applications such as a game application, a short video application, a browser application, a conference application, and a news application may be installed and run on the electronic device in the embodiments of this application.

In the embodiments of this application, when it is detected that the electronic device starts running an event, it may be determined whether the event is a specified event, and if the event is the specified event, preset signaling is sent through small data transmission, to prevent transmission of the preset signaling from affecting normal use of a primary subscriber identity module SIM card service by a user.

Figure 7:
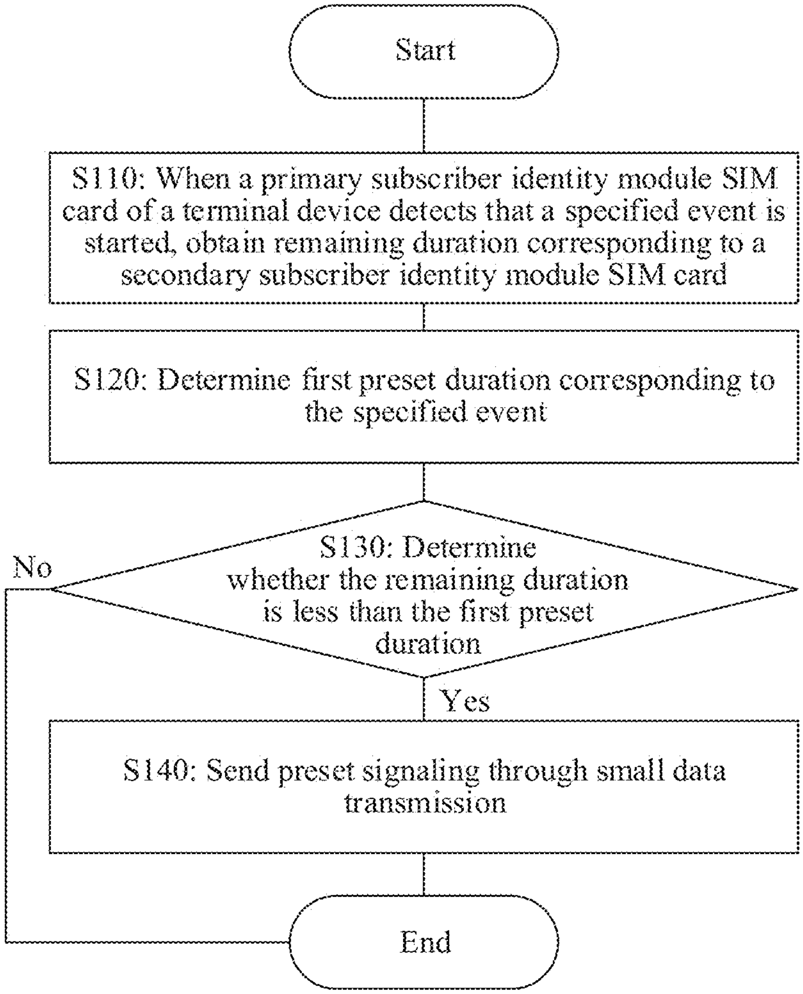
FIG. 7 is a schematic flowchart of a data transmission method according to an embodiment of this application.

FIG. 7 shows a data transmission method according to an embodiment of this application. The data transmission method may include the following step S110 to step S140.

Step S110: When a primary subscriber identity module SIM card of a terminal device detects that a specified event is started, obtain remaining duration corresponding to a secondary subscriber identity module SIM card.

It can be learned from the foregoing descriptions that a dual SIM terminal device usually has only one set of transmitting radio frequency resources, and if a secondary subscriber identity module SIM card enters a connected state for reachability when a primary subscriber identity module SIM card is in the connected state, the radio frequency resources of the primary subscriber identity module SIM card are preempted, and therefore, a data service of the primary subscriber identity module SIM card is interrupted. Especially when the data service of the primary subscriber identity module SIM card is a high-requirement service, perception of a user is significant, and consequently, use experience of the user is poor.

The high-requirement service may include a game service, a video service, a video call service, or the like. In this embodiment of this application, the data transmission method is described by using the game service as an example.

In this embodiment of this application, the specified event may be an event having a high requirement on signaling transmission time. Occurrence of preemption of radio frequency resources in a process of running the specified event is highly perceptible by the user. To ensure use experience of the user, the terminal device may detect whether the specified event is started, and if it is determined that the specified event is started, the terminal device may obtain the remaining duration for sending preset signaling.

The terminal device periodically sends the preset signaling to a network device through the secondary subscriber identity module SIM card, and the remaining duration is duration between a current moment and a moment at which the terminal device sends the preset signaling to the network device through the secondary subscriber identity module SIM card next time.

In a manner, starting of the specified event may be that a specified application is started or a specified service scenario is started. The specified application may be, for example, a game application.

In addition, the specified event may be an event preset by the user based on an actual requirement, or may be an event that is set by the terminal device before factory delivery. For example, if the user presets a game application A and a video application B as specified applications, the game application A and the video application B may be referred to as specified events (specified applications).

In some implementations, if the terminal device detects that an event is triggered, the terminal device may determine whether the triggered event is a specified event. If it is determined that the triggered event is a specified event, the terminal device may obtain the remaining duration for sending the preset signaling.

In some other implementations, the determining whether the triggered event is a specified event may include: obtaining an event identifier of the triggered event, and determining whether the event identifier matches one or more pre-stored specified event identifiers, and if the event identifier matches one or more pre-stored specified event identifiers, determining that the triggered event is a specified event.

In a specific implementation, the determining whether a specified event is started may be determining whether a specified game starts, determining whether a video starts to be played, or the like.

For example, if the terminal device detects that the user starts the game application A, and determines, through detection, that the game application A is a specified event, the terminal device may obtain the remaining duration for sending the preset signaling.

Figure 8A:
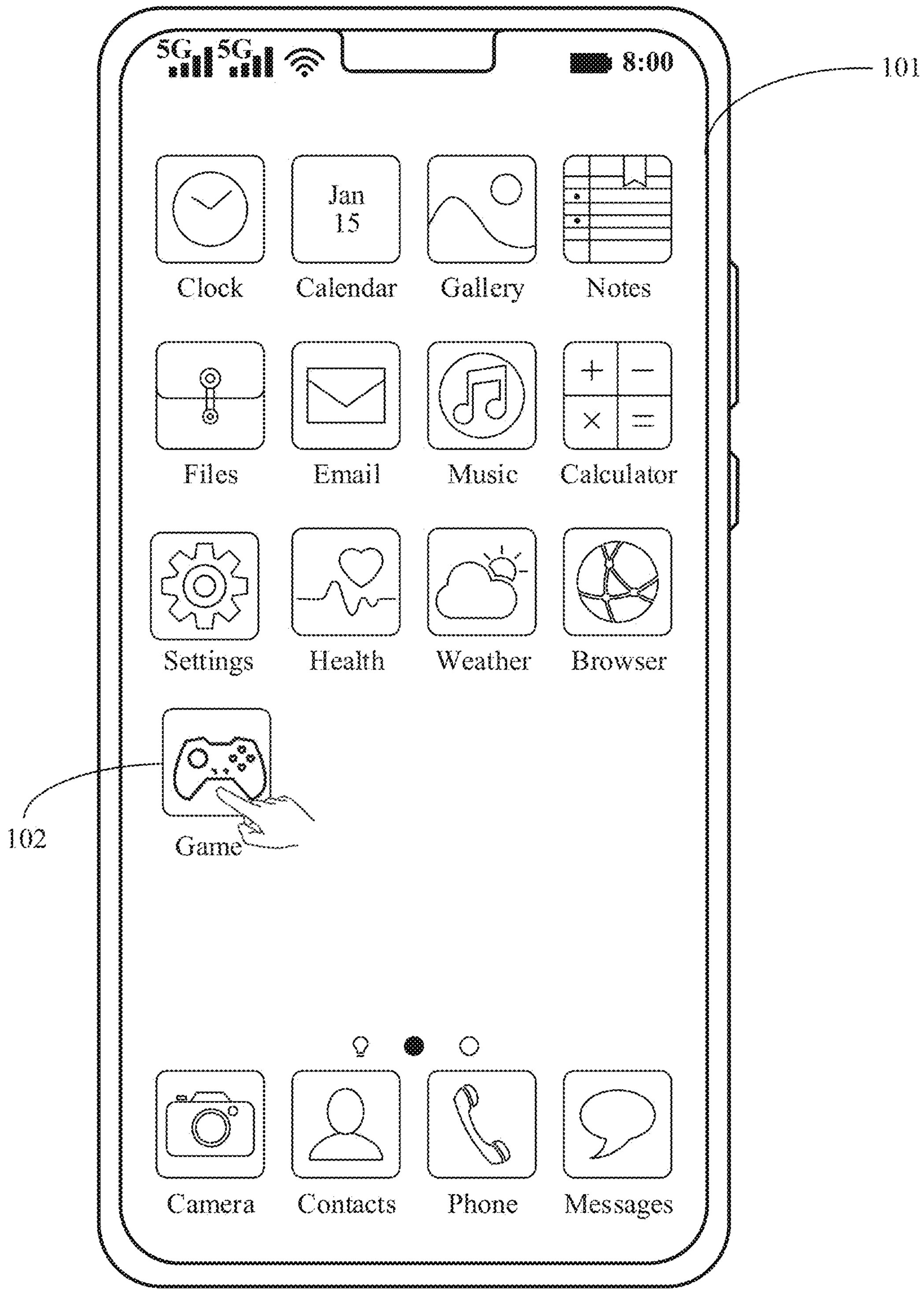
FIG. 8A~FIG. 8B are schematic diagrams of interface display examples of a terminal device in a data transmission method according to an embodiment of this application.

For example, as shown in FIG. 8A, the terminal device may display an interface 101 of a home screen. For example, one or more application icons may be displayed in the interface 101. The one or more application icons may include a clock application icon, a calendar application icon, a gallery application icon, a game application icon 102, and the like.

Figure 8B:
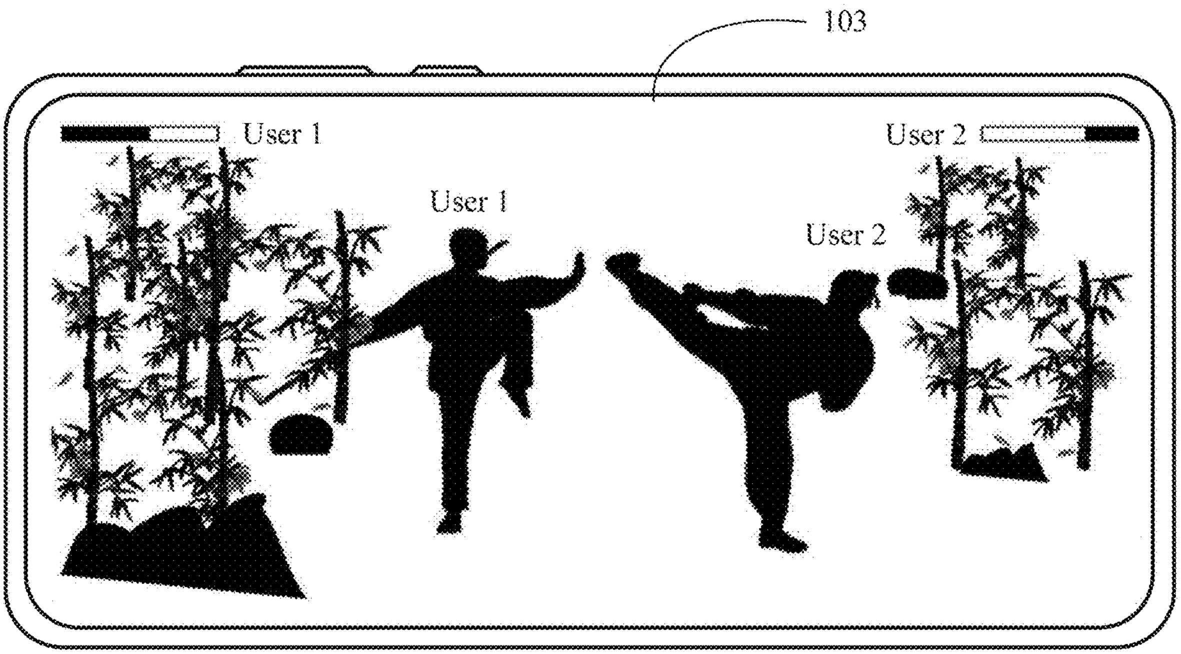

The terminal device may receive a touch operation (for example, tapping) acting on the game application icon 102, and in response to the touch operation, the terminal device may display a game application interface 103. As shown in FIG. 8B, the game application interface 103 may include a game picture, a game user, and the like.

For another example, if the terminal device detects that the user starts the game application A, and determines, through detection, that the game application A is a specified event, the terminal device may continuously detect whether the user inputs a game start operation for the game application A, and if the terminal device detects that the user inputs the game start operation for the game application A, the terminal device may obtain the remaining duration for sending the preset signaling.

In some implementations, a same application may include a plurality of service scenarios, and the service scenarios have different requirements on data transmission time. For example, the application A includes a service scenario 1 and a service scenario 2, service scenario 1 has a higher requirement on transmission time, and service scenario 2 has a lower requirement on transmission time.

Therefore, to more accurately implement data transmission, when detecting that the started application is a specified application, the terminal device may obtain a service scenario in which the application is currently located, and determine whether the service scenario is a specified service scenario. If the service scenario in which the terminal device is currently located is a specified service scenario, the terminal device may obtain the remaining duration of the preset signaling.

In this embodiment of this application, the preset signaling may be IMS (Internet Protocol Multimedia Subsystem, IP multimedia subsystem) re-registration signaling, tracking area update (TAU) signaling, or the like. For a better understanding of the solution, this solution is described now by using IMS re-registration as an example.

In a manner, registration enables the terminal device to use a service of an IMS, and to remain in contact with the network device, the terminal device periodically initiates IMS re-registration. IMS re-registration means that the terminal device has currently been authenticated bidirectionally and that a registration status of the terminal device is registered.

In addition, an IMS server allocates online duration to the terminal device after the terminal device succeeds in IMS registration. Before the online duration expires, the terminal device may re-register with the IMS server, and after the re-registration is successful, the IMS server allocates online duration to the terminal device again. This is cyclically performed in this mode to ensure that the electronic device is not disconnected from the IMS.

For example, the online duration allocated by the IMS server to the terminal device after the terminal device succeeds in IMS registration is 20 min, in other words, the terminal device is connected to the IMS in the 20 min. To be not disconnected from the IMS, the terminal device needs to perform re-registration with the IMS server before the online duration of 20 min expires.

Generally, after obtaining the online duration, the terminal device allocates a timer to continuously detect remaining online duration of the terminal device that exists after the IMS registration and remind the terminal device to re-register before the online duration expires.

The remaining duration for sending the preset signaling is remaining online duration of the terminal device in the IMS at the current moment. For example, if the terminal device successfully registers with the IMS at 10:00:00 on Jan. 29, 2022, and the IMS server allocates online duration of 20 min to the terminal device, at 10:04:00 on Jan. 29, 2022 (the current moment), the remaining online duration of the terminal device that exists after the IMS registration is 16 min, in other words, the remaining duration for sending the preset signaling is 16 min.

Figure 9:
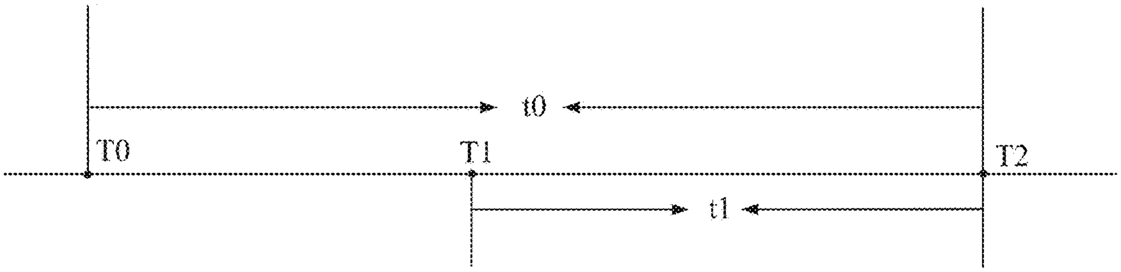
FIG. 9 is an example diagram of remaining duration in a data transmission method according to an embodiment of this application.

For a better understanding of the online duration and the remaining duration, this embodiment of this application provides a diagram shown in FIG. 9. In FIG. 9, TO represents a time point at which previous registration succeeds, T1 represents the current moment, and T2 represents a time point of IMS re-registration. In addition, to represents the online duration, and t1 represents the remaining duration for sending the preset signaling. It can be learned with reference to the foregoing example that the online duration to may be 20 min, and the remaining duration t1 may be 16 min.

In a manner, after obtaining the remaining duration for sending the preset signaling, the terminal device may determine first preset duration corresponding to the specified event, in other words, proceed to step S120.

It should be noted that the specified event in this embodiment of this application may be a data service related to the primary subscriber identity module SIM card. In addition, the preset signaling may include at least one piece of small data.

Step S120: The terminal device determines the first preset duration corresponding to the specified event.

In this embodiment of this application, the first preset duration corresponding to the specified event may be total duration from the start to the end of the specified event. For example, when the specified event is a game, the first preset duration may be duration of one game, that is, duration from the start of the game to the end of the game.

In some implementations, the corresponding first preset duration varies with the specified event. For example, first preset duration corresponding to a first specified event is A, and first preset duration corresponding to a second specified event is B.

In a manner, specified events and first preset duration may be stored in the terminal device in a one-to-one correspondence. When determining first preset duration corresponding to a specified event, the terminal device may directly search a memory of the terminal device for the first preset duration corresponding to the specified event.

In another manner, specified events and first preset duration may be stored on a cloud in a one-to-one correspondence, and when determining first preset duration corresponding to a specified event, the terminal device may send a first preset duration obtaining request to the cloud to indicate the cloud to obtain the first preset duration corresponding to the specified event.

In this embodiment of this application, the first preset duration corresponding to the specified event may be obtained based on big data, cloud data, or the like. In addition, first preset duration corresponding to different users may be the same or different. In other words, the first preset duration may alternatively be adjusted based on an actual use case of the user.

For example, when the specified event is a game, if a user A has a higher proficiency level than a user B, first preset duration corresponding to the user A may be less than first preset duration corresponding to the user B. How to specifically obtain the first preset duration is not explicitly limited herein, and may be selected based on an actual case.

Step S130: The terminal device determines whether the remaining duration is less than the first preset duration.

In a manner, when obtaining the remaining duration for sending the preset signaling and the first preset duration corresponding to the specified event, the terminal device may determine whether the remaining duration is less than the first preset duration. If the remaining duration is less than the first preset duration, the terminal device may send the preset signaling through small data transmission.

In addition, if the remaining duration is greater than the first preset duration, it indicates that the specified event has ended when the preset signaling is being sent, and in this case, sending the preset signaling does not affect the specified event on the primary subscriber identity module SIM card, and the secondary subscriber identity module SIM card can perform IMS re-registration in the connected state. In other words, if the terminal device determines that the remaining duration is greater than the first preset duration, this solution ends.

Figure 10:
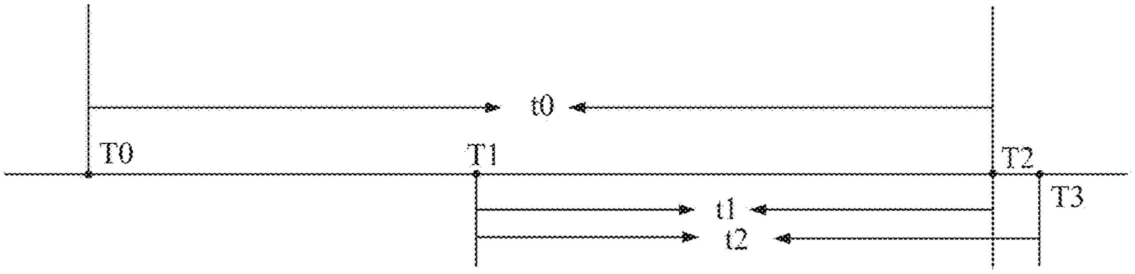
FIG. 10 is an example diagram of a relationship between remaining duration and first preset duration in a data transmission method according to an embodiment of this application.

To clearly understand a relationship between the remaining duration and the first preset duration, this embodiment of this application provides an example diagram shown in FIG. 10. In FIG. 10, T1 may be a starting time (the current moment) of the specified event, T3 may be an ending time of the specified event, and duration between the starting time T1 and the ending time T3 may be referred to as the first preset duration, in other words, t2 represents the first preset duration.

It should be noted that the ending time in this embodiment of this application is an estimated time, and is not an actual ending time of the specified event. It can be learned by comparing t1 and t2 in FIG. 10 that the remaining duration t1 in FIG. 10 is less than the first preset duration t2. In this case, the terminal device may send the preset signaling through small data transmission, in other words, proceed to step S140.

Step S140: The terminal device sends the preset signaling through small data transmission.

It can be learned from the foregoing descriptions that if the remaining duration is greater than the first preset duration, the terminal device is enabled to send the preset signaling through small data transmission when the secondary subscriber identity module SIM card is in an inactive state.

Small data transmission (SDT) is transmission of a data packet with a quite small service volume, and small data transmission is mainly based on a network configuration. For example, when an amount of data that the terminal device needs to send is less than a preset value, or when characteristics such as delay requirements and service periodicities of some services are taken into account, the network may configure the terminal device to use the small data transmission method.

In addition, small data transmission means that the terminal device can perform data transmission without entering an RRC connected state. Performing small data transmission can effectively improve data transmission efficiency and reduce power consumption of the terminal device. Small data transmission may also be referred to as advanced data sending/early data transmission.

In a manner, if there is to-be-transmitted uplink data when the secondary subscriber identity module SIM card is in the inactive (Inactive) state, the secondary subscriber identity module SIM card of the terminal device may send the uplink small data for the first time by using a Msg3/MsgA or a CG in a RACH procedure.

In this embodiment of this application, to ensure use experience of the user and prevent transmission of service data related to the specified event by the primary subscriber identity module SIM card from being affected by the secondary subscriber identity module SIM card, the terminal device may send the preset signaling through small data transmission when determining that the remaining duration is less than the first preset duration. This can ensure transmission of the preset signaling, and can also ensure use experience of the user.

In some implementations, after sending the uplink small data for the first time by using the Msg3/MsgA or the CG in the RACH procedure, the terminal device may determine whether transmission of the uplink data is completed. If transmission of the uplink data is completed, small data transmission ends. If transmission of the uplink data has not been completed during the first time of small data transmission (initial small data transmission), subsequent small data may be transmitted through one or more times of subsequent transmission (subsequent small data transmission).

In other words, after sending the uplink small data for the first time, the terminal device may determine whether there is still to-be-transmitted uplink data, and if there is no to-be-transmitted uplink data, small data transmission ends.

If there is still to-be-transmitted uplink data, one or more times of subsequent transmission may be performed.

In this embodiment of this application, the preset signaling may include at least one piece of small data, and if transmission of the preset signaling can be completed by using the first time of small data transmission, transmission of the preset signaling directly ends. If transmission of the preset signaling cannot be completed by using the first time of small data transmission, subsequent small data may be transmitted through subsequent transmission.

Figure 11:
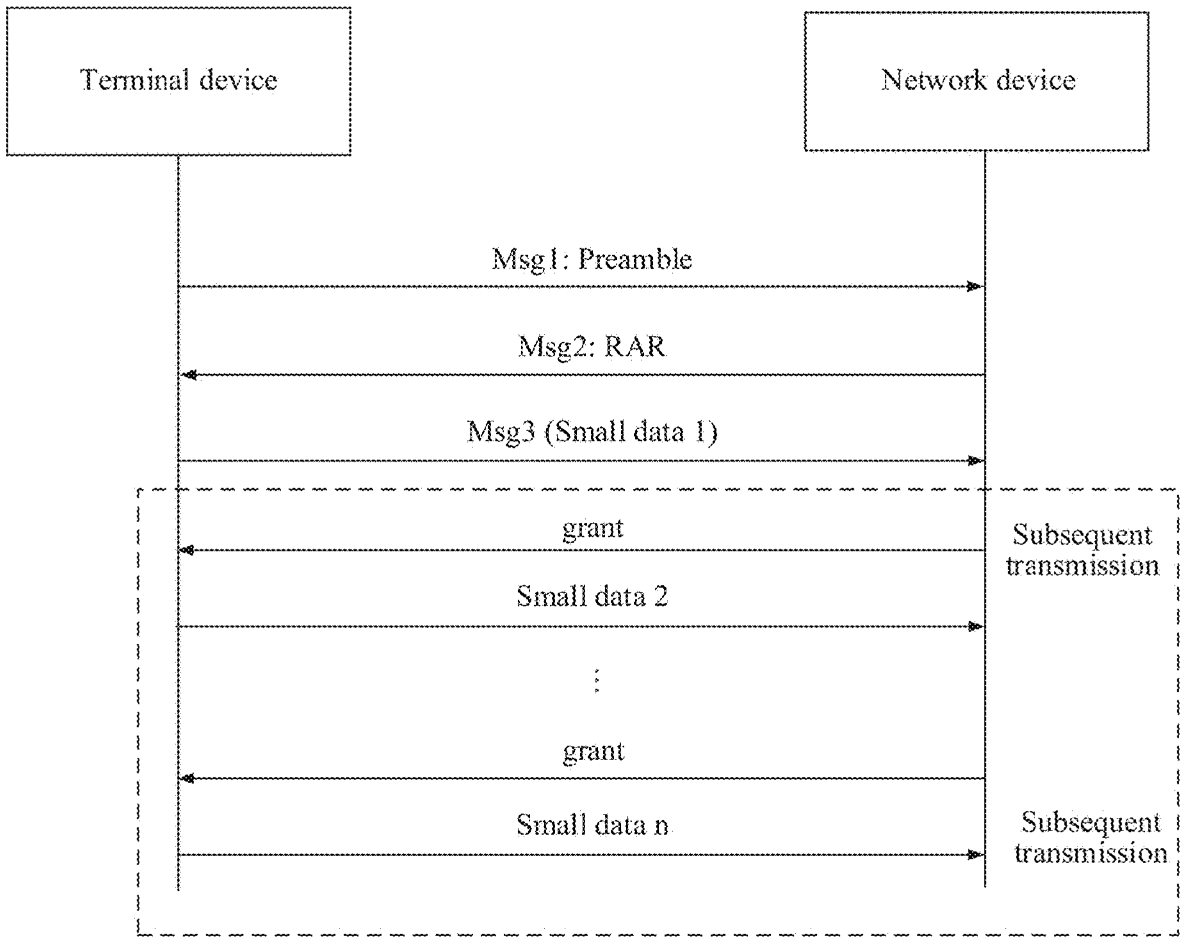
FIG. 11 is an example diagram of a process of performing small data transmission on preset signaling in a data transmission method according to an embodiment of this application.

For a clearer understanding of a process of subsequent transmission, this application describes the process by using a Msg3 as an example. For details, refer to FIG. 11. It can be learned from FIG. 11 that the terminal device may send a Msg1 to the network device before sending uplink small data for the first time by using the Msg3 in the RACH procedure. The Msg1 may be referred to as a preamble (random access preamble).

On the basis of the above, the network device may send a Msg2 to the terminal device. The Msg2 may also be referred to as an RAR (random access response) message. After receiving the Msg2, the terminal device may send the small data and other information to the network device by using the Msg3.

Then the terminal device may receive a grant transmitted by the network device. The grant may be a UL grant, and is mainly used to allocate uplink transmission resources. In addition, the UL grant may also be referred to as an uplink grant. The terminal device may transmit subsequent small data to the network device after receiving the grant transmitted by the network device. For example, the terminal device transmits small data 2, small data 3, and small data n to the network device through a plurality of times of transmission. In this way, transmission of the preset signaling can be ensured, and use experience of the user can also be prevented from being affected by transmission of the preset signaling.

It should be noted that processes of transmitting subsequent small data by using the MsgA and the CG are similar to that using Msg3, and are not described herein again.

In conclusion, when the terminal device sends the preset signaling through small data transmission, the preset signaling may be divided into a plurality of pieces of small data, and the plurality of pieces of small data may be separately transmitted to the network device. These pieces of small data may be small data 1, small data 2, small data n, and the like. When transmitting each piece of small data through small data transmission, the terminal device only needs to be switched to the secondary subscriber identity module SIM card for 20-30 ms each time, so that data transmission of the primary subscriber identity module SIM card is little affected.

Figure 12:
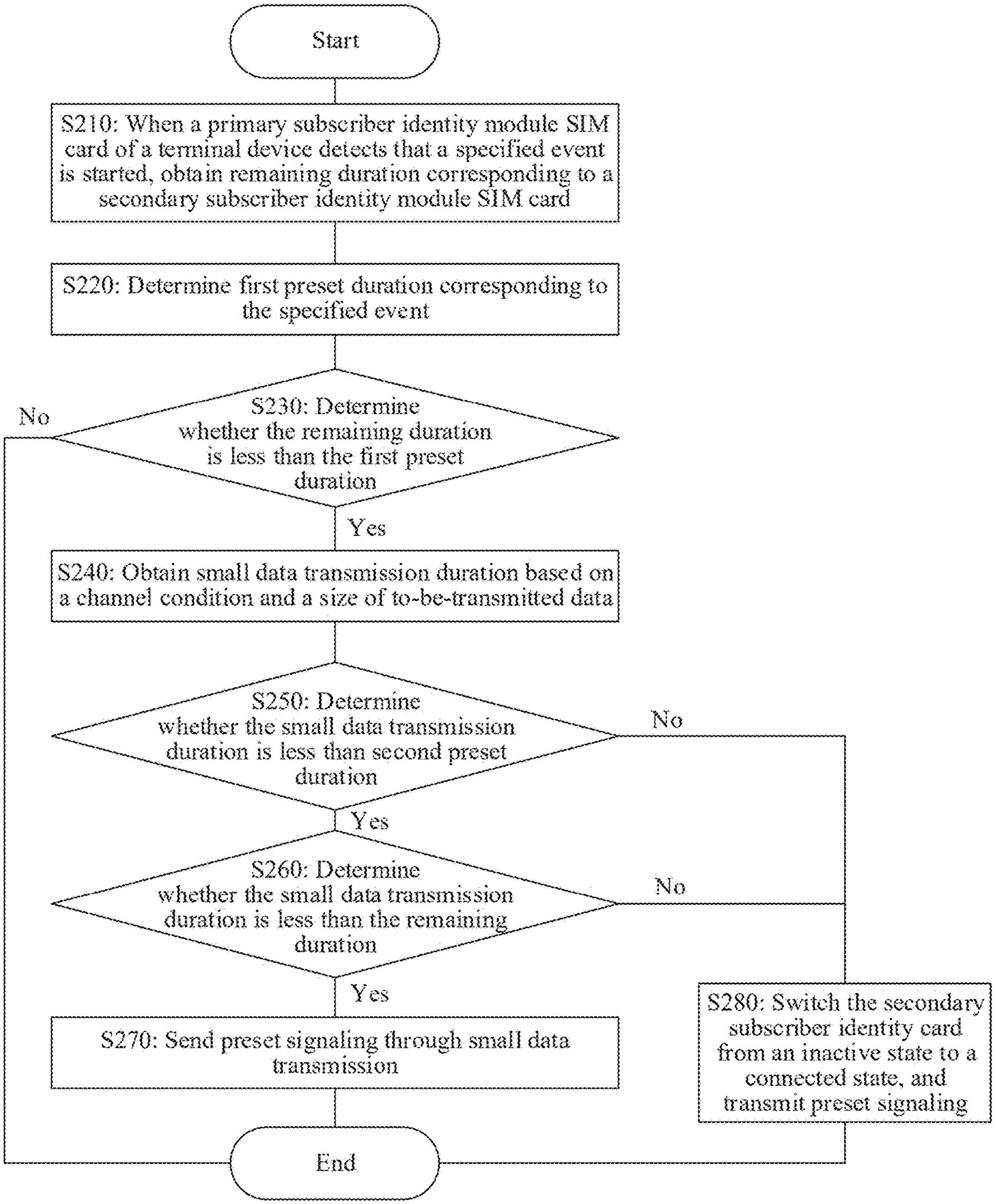
FIG. 12 is a schematic flowchart of a data transmission method according to another embodiment of this application.

FIG. 12 shows a data transmission method according to another embodiment of this application. The data transmission method may include the following step S210 to step S280.

Step S210: When a primary subscriber identity module SIM card of a terminal device detects that a specified event is started, obtain remaining duration corresponding to a secondary subscriber identity module SIM card.

Step S220: The terminal device determines first preset duration corresponding to the specified event.

In this embodiment of this application, step S210 to step S220 are described in detail in the foregoing embodiment, and are not described herein again.

Step S230: The terminal device determines whether the remaining duration is less than the first preset duration.

In a manner, when determining that the remaining duration is less than the first preset duration, the terminal device may obtain small data transmission duration based on a channel condition and a size of to-be-transmitted data, in other words, proceed to step S240. Similarly, if the remaining duration is equal to the first preset duration, the terminal device may also obtain small data transmission duration based on a channel condition and a size of to-be-transmitted data.

In addition, if the remaining duration is greater than the first preset duration, it indicates that the terminal device can complete execution of the specified event before transmitting preset signaling, and in this case, there is no need to transmit the preset signaling through small data transmission, and a solution provided in this application ends.

Step S240: The terminal device obtains the small data transmission duration based on the channel condition and the size of the to-be-transmitted data.

In this embodiment of this application, the channel condition may also be referred to as a current channel status (e.g., signal to interference plus noise ratio (SINR)). The SINR mainly corresponds to current signal quality of a standard terminal device. Specifically, a larger SINR indicates better channel quality of the terminal device. On the contrary, a smaller SINR indicates poorer channel quality of the terminal device.

In a manner, the terminal device may estimate an MCS (modulation and coding scheme) based on a current SINR. If an MCS index is larger, a modulation and coding scheme selected for an air interface is higher, and further, it may be determined that a data transmission rate of the terminal device is higher.

In another manner, the terminal device may obtain historical information of data transmission of the secondary subscriber identity module SIM card, namely, historical transmission information. Then the terminal device predicts a quantity of scheduled resource blocks (RBs) based on the historical transmission information. An RB is a resource allocation unit, and includes a plurality of contiguous subcarriers in one slot. If there are more RBs, more scheduled resources are selected for the air interface, and further, it may be determined that a data transmission rate of the terminal device is higher. The quantity of scheduled RBs may be a quantity of resource blocks that may be subsequently scheduled on a network side.

In some implementations, after obtaining the predicted MCS value and the quantity of scheduled RBs, the terminal device may obtain a target data amount based on the predicted MCS value and the quantity of scheduled RBs. The target data amount may also be referred to as a subsequent data amount. On the basis of the above, the small data transmission duration is obtained with reference to the size of the to-be-transmitted data and the target data amount. The size of the to-be-transmitted data may also be referred to as a quantity of bits of the preset signaling.

In this process, the terminal device may first obtain an initial transmission data amount, and the initial transmission data stream may be a data amount of the first time of small data transmission. For example, the initial transmission data amount may be less than or equal to 1000 bytes.

In addition, in a process of obtaining the small data transmission duration, the terminal device may estimate a delay of one time of small data transmission, and then obtain the small data transmission duration with reference to the size of the to-be-transmitted data, the target data amount, the initial transmission data amount, and the delay of one time of small data transmission.

For a clearer understanding of a process of obtaining a small data transmission delay, in this embodiment of this application, y may be used as the size of the to-be-transmitted data, x1 may be used as the initial transmission data amount, x2 may be used as the target data amount, and t4 may be used as the delay of one time of small data transmission. Finally, a formula for obtaining the small data transmission duration t3 may be as follows:

$$t3 = t4 + \text{ceil}\left[(y - x1)/x2\right] * t4,$$

where ceil may be used to return a smallest integer greater than or equal to a specified expression.

Step S250: The terminal device determines whether the small data transmission duration is less than second preset duration.

In a manner, after obtaining the small data transmission duration, the terminal device may determine whether the small data transmission duration is less than the second preset duration. The second preset duration may be duration in which the secondary subscriber identity module SIM card transmits signaling once in a connected state, or may be other preset duration.

In addition, the corresponding second preset duration may vary with the signaling transmitted by the secondary subscriber identity module SIM card. For example, when time in which the secondary subscriber identity module SIM card enters the connected state to transmit IMS re-registration signaling once is 1.5~2 seconds, the second preset duration may be set to 1.5 seconds. For another example, second preset duration in which the secondary subscriber identity module SIM card enters the connected state to transmit tracking area update signaling once is other time that is completely different from 1.5 seconds. The foregoing settings of the second preset duration are merely examples, and a specific setting depends on an actual case.

In some implementations, if the small data transmission duration is less than the second preset duration, it indicates that the preset signaling can be transmitted in an inactive state, and in this case, the terminal device may continue to determine whether the small data transmission duration is less than the remaining duration, in other words, proceed to step S260.

In this embodiment of this application, when determining that the small data transmission duration is greater than or equal to the second preset duration, the terminal device may switch the secondary subscriber identity module SIM card from the inactive state to the connected state, and transmit the preset signaling in the connected state, in other words, proceed to step S280.

Step S260: The terminal device determines whether the small data transmission duration is less than the remaining duration.

In some implementations, before sending the preset signaling through small data transmission, the terminal device may also determine whether the small data transmission duration is less than the remaining duration for sending the preset signaling. If the small data transmission duration is less than the remaining duration, the terminal device is enabled to send the preset signaling through small data transmission when the secondary subscriber identity module SIM card is in the inactive state, in other words, step S270 is entered. In this way, accuracy of small data transmission can be ensured to some extent.

In addition, if the small data transmission duration is greater than or equal to the remaining duration, the secondary subscriber identity module SIM card may be switched from the inactive state to the connected state, and the preset signaling may be transmitted in the connected state, in other words, step S280 is entered.

In conclusion, in this embodiment of this application, the preset signaling may be sent through small data transmission only when it is determined that the small data transmission duration is less than the second preset duration and the small data transmission duration is less than the remaining duration. In addition, if the small data transmission duration cannot meet either of the foregoing two conditions, the terminal device is enabled to transmit the preset signaling in the connected state. In this way, effectiveness of data transmission can be ensured to some extent.

In other words, when determining that the small data transmission duration is greater than the second preset duration, the terminal device may switch the secondary subscriber identity module SIM card from the inactive state to the connected state. When determining that the small data transmission duration is greater than the remaining duration, the terminal device may switch the secondary subscriber identity module SIM card from the inactive state to the connected state. When determining that the small data transmission duration is greater than the second predetermined duration and the small data transmission duration is greater than the remaining duration, the terminal device may also switch the secondary subscriber identity module SIM card from the inactive state to the connected state.

It should be noted that the terminal device may first determine whether the small data transmission duration is less than the second preset duration, and then determine whether the small data transmission duration is less than the remaining duration; or may first determine whether the small data transmission duration is less than the remaining duration, and then determine whether the small data transmission duration is less than the second preset duration; or may simultaneously determine whether the small data transmission duration is less than the second preset duration and determine whether the small data transmission duration is less than the remaining duration. A specific sequence of determining the conditions is not explicitly limited herein, and may be selected based on an actual case.

Figure 13:
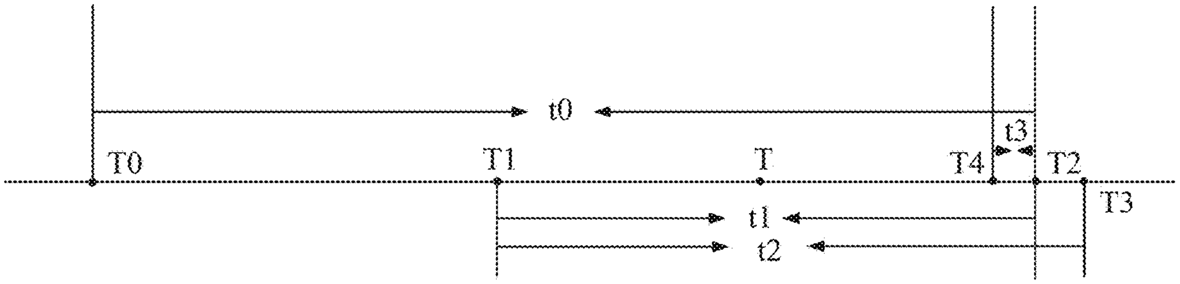
FIG. 13 is an example diagram of a relationship between small data transmission duration, remaining duration, and first preset duration in a data transmission method according to another embodiment of this application.

For a clearer understanding of a relationship between the small data transmission duration, the remaining duration, and the first preset duration, this embodiment of this application provides an example diagram shown in FIG. 13. In FIG. 13, t3 may be the small data transmission duration, and T4 may be a time point of the first time of small data transmission.

For example, the specified event is a game, the remaining duration t1 is 15 minutes, the first preset duration t2 (duration of one game) is 20 minutes, small data transmission duration t3 of IMS re-registration signaling is 1 second, and the second preset duration is 1.5 seconds.

It can be learned that the remaining duration t1 is less than the first preset duration t2 in this example. On the basis of the above, it is determined that the small data transmission duration t3 of IMS re-registration signaling is less than the second preset duration and the small data transmission duration t3 of IMS re-registration signaling is also less than the remaining duration t1. In this case, the terminal device sends the preset signaling through small data transmission when the secondary subscriber identity module SIM card is in the inactive state.

Step S270: The terminal device sends the preset signaling through small data transmission.

In a manner, in this embodiment of this application, the preset signaling may be sent through small data transmission when it is determined that the small data transmission duration is less than the second preset duration and the small data transmission duration is less than the remaining duration.

In some implementations, the terminal device may immediately send the preset signaling through small data transmission when determining that the small data transmission duration is less than the second preset duration and the small data transmission duration is less than the remaining duration. A transmission moment in this case may be a current moment, and T1 shown in FIG. 13 may be a time at which small data transmission starts.

In addition, the time at which small data transmission starts may alternatively be any one of T1 to T4. T4 is a moment of T2 minus t3. T shown in FIG. 13 may be the moment at which small data transmission starts. A specific moment at which small data transmission starts is not explicitly limited herein.

It can be learned from the foregoing descriptions that the preset signaling sent through small data transmission may be divided into two parts. Preset signaling transmitted in a first part may also be referred to as uplink small data of the first time of transmission. Preset signaling transmitted in a second part may also be referred to as uplink small data of subsequent transmission.

To reduce a quantity of times of small data transmission, in this embodiment of this application, a quantity of bits of transmission signaling of the secondary subscriber identity module SIM card may be reduced to obtain target signaling. The transmission signaling of the secondary subscriber identity module SIM card may be periodically sent signaling.

In a manner, the terminal device may screen the preset signaling through incremental transmission to obtain target signaling, so that the quantity of times of small data transmission can be reduced. In other words, the terminal device may transmit only changing data to the network device. For example, the terminal device may send only changing routing information to the network device when sending IMS re-registration signaling (the IMS re-registration signaling includes authentication information and session description information) through small data transmission.

In another manner, the terminal device may screen the preset signaling through signaling streamlining to obtain target signaling, to reduce the quantity of times of small data transmission. For example, the terminal device may streamline authentication information to a UE ID (UE identifier) when the terminal device sends IMS re-registration signaling (the IMS re-registration signaling includes the authentication information and session description information) through small data transmission, and a specific authentication operation may be performed by the network device. The UE ID may be used as user identification information in this embodiment of this application.

Step S280: The terminal device switches a status of the secondary subscriber identity module SIM card from the inactive state to the connected state, and sends the preset signaling to the network device.

In a manner, the terminal device may switch the status of the secondary subscriber identity module SIM card from the inactive state to the connected state after screening the preset signaling to obtain the target signaling, and send the target signaling to the network device in the connected state.

Figure 14:
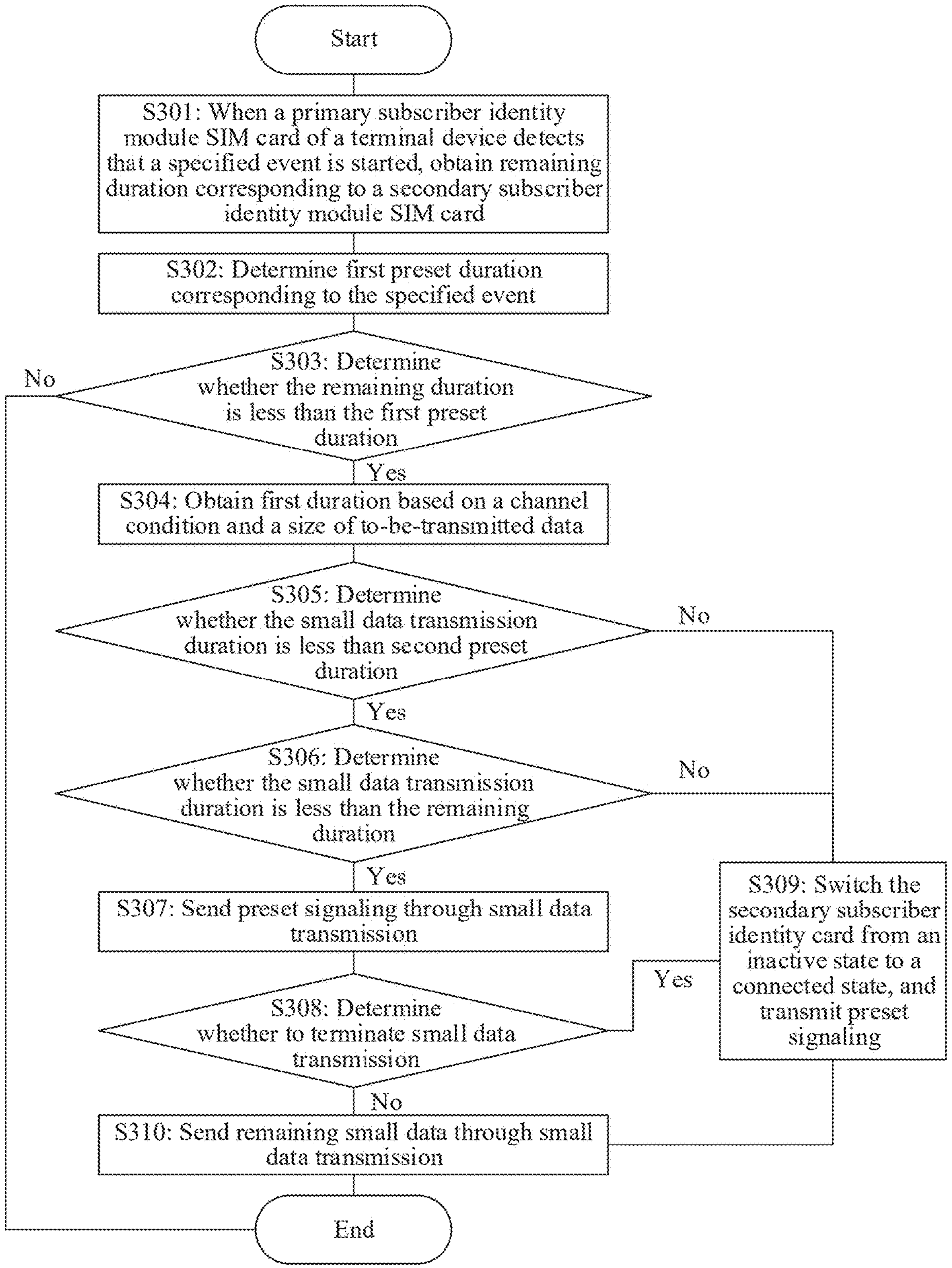
FIG. 14 is a schematic flowchart of a data transmission method according to another embodiment of this application.

FIG. 14 shows a data transmission method according to still another embodiment of this application. The data transmission method may include the following step S301 to step S310.

Step S301: When a primary subscriber identity module SIM card of a terminal device detects that a specified event is started, obtain remaining duration corresponding to a secondary subscriber identity module SIM card.

Step S302: The terminal device determines first preset duration corresponding to the specified event.

Step S303: The terminal device determines whether the remaining duration is less than the first preset duration.

Step S304: The terminal device obtains small data transmission duration based on a channel condition and a size of to-be-transmitted data.

Step S305: The terminal device determines whether the small data transmission duration is less than second preset duration.

Step S306: The terminal device determines whether the small data transmission duration is less than the remaining duration.

In this embodiment of this application, step S301 to step S306 are described in detail in the foregoing embodiment, and are not described herein again.

Step S307: The terminal device sends preset signaling through small data transmission.

In some implementations, when determining that the small data transmission duration is less than the second preset duration and is less than the remaining duration, the terminal device may send uplink small data through small data transmission for the first time when the secondary subscriber identity module SIM card is in an inactive state. On the basis of the above, it is determined whether there is still to-be-transmitted uplink data, and if there is still to-be-transmitted uplink data, the terminal device may transmit subsequent small data through subsequent transmission. In addition, if there is no to-be-transmitted uplink data, small data transmission ends.

It should be noted that when it is determined that there is still to-be-transmitted uplink data, in this embodiment of this application, it may also be determined whether to terminate small data transmission, in other words, step S308 is entered.

Step S308: The terminal device determines whether to terminate small data transmission.

It can be learned from the foregoing descriptions that, to more accurately obtain the small data transmission duration, in this application, a quantity of RBs that may be subsequently scheduled on a network side needs to be predicted based on historical transmission information. However, there may be a deviation in the quantity of scheduled RBs that is obtained through prediction, resulting in inaccuracy of finally obtained small data transmission duration.

In a manner, in this embodiment of this application, after uplink small data is sent through small data transmission for the first time, an actual MCS and quantity of scheduled RBs may be obtained based on a grant transmitted back by the network device, in other words, a predicted MCS and the predicted quantity of RBs may be updated. In other words, after sending uplink small data for the first time, the terminal device may obtain the actual MCS and the quantity of actually scheduled RBs based on the grant received by the terminal device.

In another manner, the quantity of scheduled RBs may be obtained by the network device. Specifically, the network device may determine the quantity of scheduled RBs based on signal quality of a carrier, transmit power of the carrier, maximum transmit power of the terminal device, and/or an amount of data to be transmitted by the terminal device. On the basis of the above, the network device sends the quantity of scheduled RBs that is obtained by the network device to the terminal device.

It can be learned from the foregoing descriptions that the MCS is mainly used to determine resource efficiency of the terminal device, and the quantity of actually scheduled RBs is used to determine a quantity of to-be-allocated resources. Therefore, the terminal device may obtain the current actual MCS value and the quantity of actually scheduled RBs after sending the uplink small data for the first time.

On the basis of the above, the terminal device may update a target data amount in the foregoing embodiments based on the MCS and the quantity of actually scheduled RBs, and then update the small data transmission duration to obtain latest small data transmission duration. The small data transmission duration in this case may be referred to as target transmission duration.

In a manner, when determining whether to terminate small data transmission, the terminal device may determine whether the target transmission duration is greater than the second preset duration. If it is determined that the target transmission duration is greater than the second preset duration, the terminal device determines to terminate small data transmission. In this case, the terminal device may switch the secondary subscriber identity module SIM card from the inactive state to the connected state, and send the preset signaling to the network device in the connected state.

In another manner, when determining whether to terminate small data transmission, the terminal device may also determine whether the quantity of actually scheduled RBs is less than n times the estimated quantity of scheduled RBs, where n may be any value less than 1. For example, n may be 0.8, in other words, it is determined whether the quantity of actually scheduled RBs is less than 0.8 time the estimated quantity of scheduled RBs. For another example, n may be 0.75, in other words, it is determined whether the quantity of actually scheduled RBs is less than 0.75 time the estimated quantity of scheduled RBs. n may be a value preset based on a requirement, and a specific value to which n is set is not explicitly limited herein.

In addition, if the quantity of actually scheduled RBs is less than n times the estimated quantity of scheduled RBs, it is determined to terminate small data transmission. In this case, the terminal device may switch the secondary subscriber identity module SIM card from the inactive state to the connected state, and send the preset signaling to the network device in the connected state.

It should be noted that each time the terminal device receives a subsequent grant, the terminal device may determine whether to terminate small data transmission, and if it is determined to terminate small data transmission, switch the status of the secondary subscriber identity module SIM card from the inactive state to the connected state, and transmit the preset signaling in the connected state. In other words, in this embodiment of this application, it may be determined a plurality of times whether to terminate small data transmission.

In addition, the terminal device may send subsequent small data to the network device through subsequent transmission when determining not to terminate small data transmission.

Step S309: The terminal device switches the status of the secondary subscriber identity module SIM card from the inactive state to the connected state, and sends the preset signaling to the network device.

Step S310: The terminal device sends remaining small data through small data transmission.

It can be learned from the foregoing descriptions that after sending uplink data to the network device through small data transmission for the first time, the terminal device may determine whether to terminate small data transmission, in other words, whether to terminate transmission of subsequent small data. If it is determined to terminate small data transmission, the terminal device switches the secondary subscriber identity module SIM card from the inactive state to the connected state, and transmit the remaining small data in the preset signaling in the connected state.

In addition, if it is determined not to terminate transmission of the subsequent small data, in this embodiment of this application, the remaining small data may continue to be sent through small data transmission. A transmission manner in this case may also be referred to as a subsequent small data transmission manner, namely, subsequent transmission.

It may be understood that to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person of skill in the art may use different methods to implement the described functions with reference to embodiments for each particular application, but it should not be considered that the implementation goes beyond the scope of this application.

The embodiments further provide a computer storage medium. The computer storage medium stores computer instructions. When the computer instructions are run on an electronic device, the electronic device is enabled to perform the foregoing related method steps to implement the data transmission method in the foregoing embodiments.

The embodiments further provide a computer program product. When the computer program product runs on a computer, the computer is enabled to perform the foregoing related steps to implement the data transmission method in the foregoing embodiments.

In addition, an embodiment of this application further provides an apparatus. The apparatus may be specifically a chip, a component, or a module. The apparatus may include a processor and a memory that are connected. The memory is configured to store computer executable instructions. When the apparatus runs, the processor may execute the computer executable instructions stored in the memory, so that the chip is enabled to perform the data transmission method in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

According to the foregoing descriptions of the implementations, a person skilled in the art may understand that for the purpose of convenient and brief description, division into the foregoing function modules is merely used as an example for illustration. In actual application, the foregoing functions may be allocated to different function modules for implementation based on a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division, and there may be another division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or other forms.

The units described as separate parts may or may not be physically separate, and parts displayed as units may be one or more physical units, and may be located in one place, or may be distributed in a plurality of different places. Some or all of the units may be selected based on an actual requirement to achieve the objectives of the solutions of the embodiments.

In addition, function units in the embodiments of this application may be integrated into one processing unit, or each unit may exist alone physically, or two or more units may be integrated into one unit. The integrated unit may be implemented in a form of hardware, or may be implemented in a form of a software functional unit.

Any content of the embodiments of this application and any content of a same embodiment may be freely combined. Any combination of the foregoing content falls within the scope of this application.

If the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a read-only memory (ROM), a random access memory (RAM), a magnetic disk, or an optical disc.

Although the embodiments of this application have been described above with reference to the accompanying drawings, this application is not limited to the foregoing specific implementations, and the foregoing specific implementations are merely examples but are not restrictive. Under teachings of this application, a person of ordinary skill in the art does not depart from this application.

The invention claimed is:

1. A data transmission method, applied to a terminal device, wherein the terminal device comprises a primary subscriber identity module (SIM) card and a secondary SIM card, and wherein the method comprises:

obtaining, by the terminal device based on the primary SIM card detecting that a specified event is started, a remaining duration corresponding to the secondary SIM card, wherein the terminal device periodically sends preset signaling to a network device through the secondary SIM card, and the remaining duration is a duration between a current moment and a moment at which the terminal device sends the preset signaling to the network device through the secondary SIM card a next time;

determining, by the terminal device, a first preset duration corresponding to the specified event; and based on the remaining duration being less than the first preset duration, sending, by the terminal device, the preset signaling to the network device through small data transmission.

2. The method according to claim 1, wherein the small data transmission comprises initial small data transmission and subsequent small data transmission, and the sending, by the terminal device, the preset signaling to the network device through the small data transmission comprises:

sending the preset signaling to the network device through the initial small data transmission; and based on transmission of the preset signaling not being completed during the initial small data transmission, sending remaining preset signaling to the network device through one or more times of the subsequent small data transmission.

3. The method according to claim 1, wherein the sending, by the terminal device, the preset signaling to the network device through the small data transmission comprises:

obtaining a quantity of bits of the preset signaling, and determining a channel condition corresponding to the secondary SIM card;

obtaining a small data transmission duration based on the quantity of bits of the preset signaling and the channel condition; and based on the small data transmission duration being less than a second preset duration and the small data transmission duration being less than the remaining duration, sending the preset signaling to the network device through the small data transmission.

4. The method according to claim 3, wherein the method further comprises:

based on the small data transmission duration being greater than the second preset duration or the small data transmission duration being greater than the remaining duration, switching the secondary SIM card from an inactive state to a connected state; and sending the preset signaling to the network device.

5. The method according to claim 3, wherein the obtaining the small data transmission duration based on the quantity of bits of the preset signaling and the channel condition comprises:

obtaining a first modulation and coding policy based on the channel condition;

obtaining historical transmission information corresponding to the secondary SIM card, and making a prediction on the historical transmission information to obtain a first scheduled resource quantity;

obtaining a target data amount based on the first modulation and coding policy and the first scheduled resource quantity; and obtaining the small data transmission duration based on the target data amount and the quantity of bits of the preset signaling.

6. The method according to claim 5, wherein the preset signaling comprises at least one piece of small data, and the sending, by the terminal device, the preset signaling to the network device through the small data transmission comprises:

sending, by the terminal device, the at least one piece of small data through the small data transmission for the first time;

receiving uplink grant information transmitted by the network device, wherein the uplink grant information comprises a second modulation and coding policy and a second scheduled resource quantity;

determining, based on the uplink grant information, whether to continue sending remaining small data through the small data transmission; and based on determining to continue sending the remaining small data through the small data transmission, sending the preset signaling to the network device through the small data transmission.

7. The method according to claim 6, wherein the determining, based on the uplink grant information, whether to continue sending the remaining small data through the small data transmission comprises:

updating the small data transmission duration based on the second modulation and coding policy and the second scheduled resource quantity, to obtain a target transmission duration; and based on the target transmission duration being less than the second preset duration, determining to continue sending the remaining small data through the small data transmission.

8. The method according to claim 7, wherein the method further comprises:

based on the target transmission duration being greater than the second preset duration, stopping sending the remaining small data through the small data transmission.

9. The method according to claim 6, wherein the determining, based on the uplink grant information, whether to continue sending the remaining small data through the small data transmission comprises:

determining whether the second scheduled resource quantity is less than n times the first scheduled resource quantity, wherein n is less than 1; and based on the second scheduled resource quantity not being less than n times the first scheduled resource quantity, continuing sending the remaining small data through the small data transmission.

10. The method according to claim 9, wherein the method further comprises:

based on the second scheduled resource quantity being less than n times the first scheduled resource quantity, stopping sending the remaining small data through the small data transmission.

11. The method according to claim 1, wherein the sending, by the terminal device, the preset signaling to the network device through the small data transmission comprises:

screening the preset signaling through incremental transmission and/or signaling streamlining to obtain target signaling, wherein the incremental transmission is used to select changing data from the preset signaling, and the signaling streamlining is used to select user identification information from the preset signaling; and sending the target signaling to the network device through the small data transmission.

12. The method according to claim 1, wherein the obtaining, by the terminal device based on the primary SIM card detecting that the specified event is started, the remaining duration corresponding to the secondary SIM card comprises:

detecting, by the primary SIM card, whether a specified application is started; and obtaining, by the terminal device based on the primary SIM card detecting that the specified application is started, the remaining duration corresponding to the secondary SIM card.

13. The method according to claim 12, wherein the specified application comprises at least one service scenario, and the obtaining, by the terminal device based on the primary SIM card detecting that the specified application is started, the remaining duration corresponding to the secondary SIM card comprises:

based on the primary SIM card detecting that the specified application is started, obtaining a service scenario in which the specified application is currently located; and based on the service scenario being a specified service scenario, obtaining, by the terminal device, the remaining duration corresponding to the secondary SIM card.

14. The method according to claim 1, wherein the first preset duration varies with the specified event.

15. The method according to claim 1, wherein the specified event comprises a specified game.

16. The method according to claim 1, wherein the preset signaling comprises Internet Protocol (IP) multimedia subsystem (IMS) re-registration signaling.

17. A terminal device, comprising:

one or more processors;

a memory storing one or more computer programs;

a primary subscriber identity module (SIM) card; and a secondary SIM card;

wherein the one or more computer programs, when executed by the one or more processors, cause the terminal device to perform operations comprising:

obtaining, based on the primary SIM card detecting that a specified event is started, a remaining duration corresponding to the secondary SIM card, wherein the terminal device periodically sends preset signaling to a network device through the secondary SIM card, and the remaining duration is a duration between a current moment and a moment at which the terminal device sends the preset signaling to the network device through the secondary SIM card a next time;

determining, by the terminal device, a first preset duration corresponding to the specified event; and based on the remaining duration being less than the first preset duration, sending, by the terminal device, the preset signaling to the network device through small data transmission.

18. A non-transitory computer-readable storage medium having instructions stored that, when executed by one or more processors on a terminal device, causes the terminal device to perform operations comprising:

obtaining, based on a primary subscriber identity module (SIM) card detecting that a specified event is started, a remaining duration corresponding to a secondary SIM card, wherein the terminal device periodically sends preset signaling to a network device through the secondary SIM card, and the remaining duration is a duration between a current moment and a moment at which the terminal device sends the preset signaling to the network device through the secondary SIM card a next time;

determining, by the terminal device, a first preset duration corresponding to the specified event; and based on the remaining duration being less than the first preset duration, sending, by the terminal device, the preset signaling to the network device through small data transmission.

19. The terminal device according to claim 17, wherein the sending, by the terminal device, the preset signaling to the network device through the small data transmission comprises:

obtaining a quantity of bits of the preset signaling, and determining a channel condition corresponding to the secondary SIM card;

obtaining a small data transmission duration based on the quantity of bits of the preset signaling and the channel condition; and based on the small data transmission duration being less than a second preset duration and the small data transmission duration being less than the remaining duration, sending the preset signaling to the network device through the small data transmission.

20. The non-transitory computer-readable storage medium according to claim 18, wherein the sending, by the terminal device, the preset signaling to the network device through the small data transmission comprises:

obtaining a quantity of bits of the preset signaling, and determining a channel condition corresponding to the secondary SIM card;

obtaining a small data transmission duration based on the quantity of bits of the preset signaling and the channel condition; and based on the small data transmission duration being less than a second preset duration and the small data transmission duration being less than the remaining duration, sending the preset signaling to the network device through the small data transmission.

* * * * *